US009425855B2

(12) United States Patent
Guess et al.

(10) Patent No.: US 9,425,855 B2
(45) Date of Patent: *Aug. 23, 2016

(54) ITERATIVE INTERFERENCE SUPPRESSOR FOR WIRELESS MULTIPLE-ACCESS SYSTEMS WITH MULTIPLE RECEIVE ANTENNAS

(71) Applicant: III Holdings 1, LLC, Wilmington, DE (US)

(72) Inventors: Tommy Guess, Lafayette, CO (US); Michael L. McCloud, Boulder, CO (US); Vijay Nagarajan, Boulder, CO (US); Gagandeep Singh Lamba, Thornton, CO (US)

(73) Assignee: III HOLDINGS 1, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,600

(22) Filed: Oct. 26, 2015

(65) Prior Publication Data

US 2016/0043770 A1   Feb. 11, 2016

Related U.S. Application Data

(63) Continuation of application No. 14/520,626, filed on Oct. 22, 2014, now Pat. No. 9,172,456, which is a
(Continued)

(51) Int. Cl.
*H04B 7/02* (2006.01)
*H04L 1/02* (2006.01)
(Continued)

(52) U.S. Cl.
CPC .......... *H04B 1/7115* (2013.01); *H04B 1/71075* (2013.01); *H04B 7/0845* (2013.01);
(Continued)

(58) Field of Classification Search
CPC ............... H04B 1/7115; H04B 7/0845; H04B 1/71075; H04B 1/712; H04B 7/0894; H04B 2201/70702; H04J 11/0063
See application file for complete search history.

(56) References Cited

U.S. PATENT DOCUMENTS

| 3,742,201 A | 6/1973 | Groginsky | 235/156 |
| 4,088,955 A | 5/1978 | Baghdady | 325/56 |

(Continued)

FOREIGN PATENT DOCUMENTS

| DE | 0558910 | 1/1993 | H04B 1/16 |
| DE | 4201439 | 7/1993 | H04L 27/00 |

(Continued)

OTHER PUBLICATIONS

Response dated May 6, 2010 to Non-Final Office Action mailed Dec. 14, 2009 re U.S. Appl. No. 11/266,928. 43 Pages.
(Continued)

*Primary Examiner* — David B. Lugo
(74) *Attorney, Agent, or Firm* — McAndrews, Held & Malloy, Ltd.

(57) ABSTRACT

This invention teaches to the details of an interference suppressing receiver for suppressing intra-cell and inter-cell interference in coded, multiple-access, spread spectrum transmissions that propagate through frequency selective communication channels to a multiplicity of receive antennas. The receiver is designed or adapted through the repeated use of symbol-estimate weighting, subtractive suppression with a stabilizing step-size, and mixed-decision symbol estimates. Receiver embodiments may be designed, adapted, and implemented explicitly in software or programmed hardware, or implicitly in standard RAKE-based hardware either within the RAKE (i.e., at the finger level) or outside the RAKE (i.e., at the user or sub channel symbol level). Embodiments may be employed in user equipment on the forward link or in a base station on the reverse link. It may be adapted to general signal processing applications where a signal is to be extracted from interference.

17 Claims, 16 Drawing Sheets

Related U.S. Application Data continuation of application No. 13/896,952, filed on May 17, 2013, now Pat. No. 8,879,658, which is a continuation of application No. 13/372,483, filed on Feb. 13, 2012, now Pat. No. 8,446,975, which is a continuation of application No. 12/916,389, filed on Oct. 29, 2010, now Pat. No. 8,121,176, which is a continuation of application No. 11/491,674, filed on Jul. 24, 2006, now Pat. No. 7,826,516, which is a continuation-in-part of application No. 11/451,932, filed on Jun. 13, 2006, now Pat. No. 7,711,075.

(60) Provisional application No. 60/736,204, filed on Nov. 15, 2005.

(51) Int. Cl.
  H04B 1/7115 (2011.01)
  H04B 1/7107 (2011.01)
  H04B 7/08 (2006.01)
  H04J 11/00 (2006.01)
  H04B 1/712 (2011.01)

(52) U.S. Cl.
  CPC .......... *H04B7/0894* (2013.01); *H04J 11/0063* (2013.01); *H04B 1/712* (2013.01); *H04B 2201/70702* (2013.01)

(56) References Cited

U.S. PATENT DOCUMENTS

| | | | |
|---|---|---|---|
| 4,309,769 A | 1/1982 | Taylor, Jr. | 375/1 |
| 4,359,738 A | 11/1982 | Lewis | 343/100 |
| 4,601,046 A | 7/1986 | Halpern et al. | 375/38 |
| 4,665,401 A | 5/1987 | Garrard et al. | 342/75 |
| 4,670,885 A | 6/1987 | Parl et al. | 375/1 |
| 4,713,794 A | 12/1987 | Byington et al. | 365/45 |
| 4,780,885 A | 10/1988 | Paul et al. | 375/40 |
| 4,856,025 A | 8/1989 | Takai | 375/40 |
| 4,893,316 A | 1/1990 | Janc et al. | 375/44 |
| 4,922,506 A | 5/1990 | McCallister et al. | 375/1 |
| 4,933,639 A | 6/1990 | Barker | 324/309 |
| 4,965,732 A | 10/1990 | Roy, III et al. | 364/460 |
| 5,017,929 A | 5/1991 | Tsuda | 342/427 |
| 5,099,493 A | 3/1992 | Zeger et al. | 375/1 |
| 5,105,435 A | 4/1992 | Stilwell | 375/1 |
| 5,109,390 A | 4/1992 | Gilhousen et al. | 375/1 |
| 5,119,401 A | 6/1992 | Tsujimoto | 375/14 |
| 5,136,296 A | 8/1992 | Roettger et al. | 342/26 |
| 5,151,919 A | 9/1992 | Dent | 375/1 |
| 5,218,359 A | 6/1993 | Minamisono | 342/383 |
| 5,218,619 A | 6/1993 | Dent | 375/1 |
| 5,220,687 A | 6/1993 | Ichikawa et al. | 455/254 |
| 5,224,122 A | 6/1993 | Bruckert | 375/1 |
| 5,237,586 A | 8/1993 | Bottomley | 375/1 |
| 5,263,191 A | 11/1993 | Kickerson | 455/304 |
| 5,271,042 A | 12/1993 | Borth et al. | |
| 5,280,472 A | 1/1994 | Gilhousen et al. | 370/18 |
| 5,305,349 A | 4/1994 | Dent | 375/1 |
| 5,325,394 A | 6/1994 | Bruckert | 375/1 |
| 5,343,493 A | 8/1994 | Karimullah | 375/1 |
| 5,343,496 A | 8/1994 | Honig et al. | 375/1 |
| 5,347,535 A | 9/1994 | Karasawa et al. | 375/1 |
| 5,353,302 A | 10/1994 | Bi | 375/1 |
| 5,377,183 A | 12/1994 | Dent | 370/18 |
| 5,386,202 A | 1/1995 | Cochran et al. | 332/100 |
| 5,390,207 A | 2/1995 | Fenton et al. | 375/1 |
| 5,394,110 A | 2/1995 | Mizoguchi | 329/304 |
| 5,396,256 A | 3/1995 | Chiba et al. | 342/372 |
| 5,423,045 A | 6/1995 | Kannan | 395/750 |
| 5,437,055 A | 7/1995 | Wheatley, III | 455/33.3 |
| 5,440,265 A | 8/1995 | Cochran et al. | 329/300 |
| 5,448,600 A | 9/1995 | Lucas | 375/205 |
| 5,467,368 A | 11/1995 | Takeuchi | |
| 5,481,570 A | 1/1996 | Winters | 375/347 |
| 5,506,865 A | 4/1996 | Weaver, Jr. | 375/205 |
| 5,513,176 A | 4/1996 | Dean et al. | 370/18 |
| 5,533,011 A | 7/1996 | Dean et al. | 370/18 |
| 5,553,062 A | 9/1996 | Schilling et al. | |
| 5,553,098 A | 9/1996 | Cochran et al. | 375/324 |
| 5,568,411 A | 10/1996 | Batruni | |
| 5,602,833 A | 2/1997 | Zehavi | 370/209 |
| 5,606,560 A | 2/1997 | Malek | 370/347 |
| 5,644,592 A | 7/1997 | Divsalar et al. | 375/206 |
| 5,736,964 A | 4/1998 | Ghosh et al. | 342/457 |
| 5,761,237 A | 6/1998 | Petersen | |
| 5,787,130 A | 7/1998 | Kotzin et al. | 375/346 |
| 5,844,521 A | 12/1998 | Stephens et al. | 342/357 |
| 5,859,613 A | 1/1999 | Otto | 342/463 |
| 5,872,540 A | 2/1999 | Casabona et al. | 342/362 |
| 5,872,776 A | 2/1999 | Yang | 370/342 |
| 5,894,500 A | 4/1999 | Bruckert et al. | 375/346 |
| 5,926,761 A | 7/1999 | Reed et al. | 455/440 |
| 5,930,229 A | 7/1999 | Yoshida et al. | 370/203 |
| 5,953,369 A | 9/1999 | Suzuki | 375/206 |
| 5,978,413 A | 11/1999 | Bender | 375/206 |
| 5,995,499 A | 11/1999 | Hottinen et al. | 370/337 |
| 6,002,727 A | 12/1999 | Uesugi | 375/346 |
| 6,014,373 A | 1/2000 | Schilling et al. | 370/342 |
| 6,018,317 A | 1/2000 | Dogan et al. | 342/378 |
| 6,032,056 A | 2/2000 | Reudink | 455/560 |
| 6,088,383 A | 7/2000 | Suzuki et al. | 375/148 |
| 6,101,385 A | 8/2000 | Monte et al. | 455/427 |
| 6,104,712 A | 8/2000 | Robert et al. | 370/389 |
| 6,115,409 A | 9/2000 | Upadhyay et al. | 375/144 |
| 6,127,973 A | 10/2000 | Choi et al. | 342/378 |
| 6,131,013 A | 10/2000 | Bergstrom et al. | 455/63 |
| 6,137,788 A | 10/2000 | Sawahashi et al. | 370/342 |
| 6,141,332 A | 10/2000 | Lavean | 370/335 |
| 6,154,443 A | 11/2000 | Huang et al. | 370/210 |
| 6,157,685 A | 12/2000 | Tanaka et al. | 375/346 |
| 6,157,842 A | 12/2000 | Karlsson et al. | 455/456 |
| 6,157,847 A | 12/2000 | Buehrer et al. | 455/561 |
| 6,161,209 A | 12/2000 | Moher | |
| 6,163,696 A | 12/2000 | Bi et al. | 455/436 |
| 6,166,690 A | 12/2000 | Lin et al. | 342/383 |
| 6,172,969 B1 | 1/2001 | Kawakami et al. | 370/342 |
| 6,175,587 B1 | 1/2001 | Madhow et al. | 375/148 |
| 6,175,588 B1 | 1/2001 | Visotsky et al. | |
| 6,177,906 B1 | 1/2001 | Petrus | |
| 6,185,716 B1 | 2/2001 | Riggle | 714/769 |
| 6,192,067 B1 | 2/2001 | Toda et al. | 375/144 |
| 6,201,799 B1 | 3/2001 | Huang et al. | 370/342 |
| 6,208,683 B1 | 3/2001 | Mizuguchi et al. | |
| 6,215,812 B1 | 4/2001 | Young et al. | 375/144 |
| 6,219,376 B1 | 4/2001 | Zhodzishsky et al. | 375/148 |
| 6,222,828 B1 | 4/2001 | Ohlson et al. | 370/320 |
| 6,230,180 B1 | 5/2001 | Mohamed | 708/523 |
| 6,233,229 B1 | 5/2001 | Ranta et al. | 370/330 |
| 6,233,459 B1 | 5/2001 | Sullivan et al. | 455/456 |
| 6,240,124 B1 | 5/2001 | Wiedeman et al. | 375/130 |
| 6,252,535 B1 | 6/2001 | Kober et al. | 341/155 |
| 6,256,336 B1 | 7/2001 | Rademacher et al. | 375/140 |
| 6,259,688 B1 | 7/2001 | Schilling et al. | 370/342 |
| 6,263,208 B1 | 7/2001 | Chang et al. | 455/456 |
| 6,266,529 B1 | 7/2001 | Chheda | 455/436 |
| 6,275,186 B1 | 8/2001 | Kong | 342/363 |
| 6,278,726 B1 | 8/2001 | Mesecher et al. | 375/148 |
| 6,282,231 B1 | 8/2001 | Norman et al. | 375/144 |
| 6,282,233 B1 | 8/2001 | Yoshida | 375/148 |
| 6,285,316 B1 | 9/2001 | Nir et al. | 342/357.09 |
| 6,285,319 B1 | 9/2001 | Rose | 342/449 |
| 6,285,861 B1 | 9/2001 | Bonaccorso et al. | 455/137 |
| 6,301,289 B1 | 10/2001 | Bejjani et al. | 375/144 |
| 6,304,618 B1 | 10/2001 | Hafeez et al. | 375/341 |
| 6,307,901 B1 | 10/2001 | Yu et al. | |
| 6,308,072 B1 | 10/2001 | Labedz et al. | 455/448 |
| 6,310,704 B1 | 10/2001 | Dogan et al. | 359/127 |
| 6,317,453 B1 | 11/2001 | Chang | 375/140 |
| 6,320,919 B1 | 11/2001 | Khayrallah et al. | |
| 6,321,090 B1 | 11/2001 | Soliman | 455/440 |
| 6,324,159 B1 | 11/2001 | Mennekens et al. | 370/203 |
| 6,327,471 B1 | 12/2001 | Song | 455/440 |

(56) References Cited

U.S. PATENT DOCUMENTS

| | | | |
|---|---|---|---|
| 6,330,460 B1 | 12/2001 | Wong et al. | 455/562 |
| 6,333,947 B1 | 12/2001 | van Heeswyk et al. | 375/148 |
| 6,351,235 B1 | 2/2002 | Stilp | 342/357.06 |
| 6,351,642 B1 | 2/2002 | Corbett et al. | 455/442 |
| 6,359,874 B1 | 3/2002 | Dent | 370/342 |
| 6,362,760 B2 | 3/2002 | Kober et al. | 341/141 |
| 6,363,104 B1 | 3/2002 | Bottomley | 375/148 |
| 6,377,607 B1 | 4/2002 | Ling | 375/130 |
| 6,377,636 B1 | 4/2002 | Paulraj et al. | 375/346 |
| 6,380,879 B2 | 4/2002 | Kober et al. | 341/155 |
| 6,385,264 B1 | 5/2002 | Terasawa et al. | 375/371 |
| 6,396,804 B2 | 5/2002 | Odenwalder | 370/209 |
| 6,404,760 B1 | 6/2002 | Holtzman et al. | 370/342 |
| 6,414,949 B1 | 7/2002 | Boulanger | |
| 6,426,973 B1 | 7/2002 | Madhow et al. | |
| 6,430,216 B1 | 8/2002 | Kober | 375/148 |
| 6,449,246 B1 | 9/2002 | Barton et al. | |
| 6,459,693 B1 | 10/2002 | Park et al. | 370/342 |
| 6,466,611 B1 | 10/2002 | Bachu | |
| 6,496,534 B1 | 12/2002 | Shimizu et al. | |
| 6,501,788 B1 | 12/2002 | Wang et al. | 375/148 |
| 6,515,980 B1 | 2/2003 | Bottomley | 370/342 |
| 6,522,683 B1 | 2/2003 | Smee | |
| 6,529,495 B1 | 3/2003 | Aazhang et al. | |
| 6,535,554 B1 | 3/2003 | Webster et al. | |
| 6,546,043 B1 | 4/2003 | Kong | |
| 6,570,909 B1 | 5/2003 | Kansakoski et al. | 375/148 |
| 6,570,919 B1 | 5/2003 | Lee | |
| 6,574,270 B1 | 6/2003 | Madkour et al. | 375/148 |
| 6,580,771 B2 | 6/2003 | Kenney | 375/346 |
| 6,584,115 B1 | 6/2003 | Suzuki | 370/441 |
| 6,590,888 B1 | 7/2003 | Ohshima | 370/342 |
| 6,594,318 B1 | 7/2003 | Sindhushayana | |
| 6,647,078 B1 | 11/2003 | Thomas et al. | |
| 6,678,508 B1 | 1/2004 | Koilpillai et al. | |
| 6,680,727 B2 | 1/2004 | Butler et al. | 345/147 |
| 6,687,723 B1 | 2/2004 | Ding | |
| 6,690,723 B1 | 2/2004 | Gosse | |
| 6,711,219 B2 | 3/2004 | Thomas | 375/346 |
| 6,714,585 B1 | 3/2004 | Wang et al. | 375/148 |
| 6,724,809 B2 | 4/2004 | Reznik | |
| 6,741,634 B1 | 5/2004 | Kim | 375/144 |
| 6,754,340 B1 | 6/2004 | Ding | |
| 6,798,737 B1 | 9/2004 | Dabak et al. | 370/209 |
| 6,798,850 B1 | 9/2004 | Wedin | 375/340 |
| 6,801,565 B1 | 10/2004 | Bottomley et al. | 375/148 |
| 6,829,313 B1 | 12/2004 | Xu | 375/341 |
| 6,839,390 B2 | 1/2005 | Mills | |
| 6,850,772 B2 | 2/2005 | Mottier | |
| 6,882,678 B2 | 4/2005 | Kong et al. | 375/144 |
| 6,909,742 B1 | 6/2005 | Leonosky | |
| 6,912,250 B1 | 6/2005 | Adireddy | 375/232 |
| 6,931,052 B2 | 8/2005 | Fuller | |
| 6,947,481 B1 | 9/2005 | Citta et al. | |
| 6,947,506 B2 | 9/2005 | Mills | |
| 6,956,893 B2 | 10/2005 | Frank et al. | |
| 6,959,065 B2 | 10/2005 | Sparrman et al. | |
| 6,963,546 B2 | 11/2005 | Misra et al. | |
| 6,975,669 B2 | 12/2005 | Ling et al. | |
| 6,975,671 B2 | 12/2005 | Sindhushayana et al. | |
| 6,986,096 B2 | 1/2006 | Chaudhuri et al. | |
| 6,993,070 B1 | 1/2006 | Berthet et al. | |
| 6,996,385 B2 | 2/2006 | Messier et al. | |
| 7,010,073 B2 | 3/2006 | Black et al. | |
| 7,020,175 B2 | 3/2006 | Frank | |
| 7,027,533 B2 | 4/2006 | Abe et al. | |
| 7,035,316 B2 | 4/2006 | Smee et al. | |
| 7,035,354 B2 | 4/2006 | Karnin et al. | |
| 7,039,095 B2 | 5/2006 | Takahashi | |
| 7,042,929 B2 | 5/2006 | Pan et al. | |
| 7,051,268 B1 | 5/2006 | Sindhushayana et al. | |
| 7,054,354 B2 | 5/2006 | Gorokhov et al. | |
| 7,069,050 B2 | 6/2006 | Yoshida | |
| 7,072,628 B2 | 7/2006 | Agashe et al. | |
| 7,092,464 B2 | 8/2006 | Mills | |
| 7,133,435 B2 | 11/2006 | Papasakellariou et al. | |
| 7,200,183 B2 | 4/2007 | Olson | 375/285 |
| 7,209,511 B2 | 4/2007 | Dent | |
| 7,298,805 B2 | 11/2007 | Walton et al. | |
| 7,324,584 B1 * | 1/2008 | Vigneron et al. | 375/150 |
| 7,394,879 B2 | 7/2008 | Narayan | 375/346 |
| 7,397,842 B2 | 7/2008 | Bottomley et al. | |
| 7,397,843 B2 | 7/2008 | Grant et al. | |
| 7,430,253 B2 | 9/2008 | Olson | 375/316 |
| 7,463,609 B2 | 12/2008 | Scharf | 370/335 |
| 7,477,710 B2 | 1/2009 | Narayan | 375/349 |
| 7,535,969 B2 | 5/2009 | Catreux et al. | |
| 7,577,186 B2 | 8/2009 | Thomas | 375/148 |
| 7,623,602 B2 | 11/2009 | Guess et al. | |
| 7,733,941 B2 | 6/2010 | McCloud | |
| 7,826,516 B2 | 11/2010 | Guess et al. | |
| 8,121,176 B2 | 2/2012 | Guess et al. | |
| 3,446,975 A1 | 5/2013 | Guess et al. | |
| 8,879,658 B2 | 11/2014 | Guess et al. | |
| 9,172,456 B2 * | 10/2015 | Guess et al. | H04B 7/0845 |
| 2001/0003443 A1 | 6/2001 | Velazquez et al. | 342/367 |
| 2001/0017883 A1 | 8/2001 | Tirola et al. | |
| 2001/0020912 A1 | 9/2001 | Naruse et al. | 342/357.06 |
| 2001/0021646 A1 | 9/2001 | Antonucci et al. | 455/404 |
| 2001/0028677 A1 | 10/2001 | Wang | 375/148 |
| 2001/0046266 A1 | 11/2001 | Rakib et al. | 375/259 |
| 2001/0053143 A1 | 12/2001 | Li et al. | |
| 2002/0001299 A1 | 1/2002 | Petch et al. | 370/350 |
| 2002/0009156 A1 | 1/2002 | Hottinen et al. | |
| 2002/0021747 A1 | 2/2002 | Sequeira | 375/148 |
| 2002/0051433 A1 | 5/2002 | Affes et al. | 370/335 |
| 2002/0060999 A1 | 5/2002 | Ma | |
| 2002/0118781 A1 | 8/2002 | Thomas et al. | |
| 2002/0131534 A1 | 9/2002 | Ariyoshi et al. | |
| 2002/0154717 A1 | 10/2002 | Shima | |
| 2002/0159507 A1 | 10/2002 | Flaig et al. | |
| 2002/0172173 A1 | 11/2002 | Schilling et al. | 370/335 |
| 2002/0176488 A1 | 11/2002 | Kober | 375/147 |
| 2002/0186761 A1 | 12/2002 | Corbaton et al. | 375/231 |
| 2003/0005009 A1 | 1/2003 | Usman | |
| 2003/0012264 A1 | 1/2003 | Papasakellariou et al. | |
| 2003/0035468 A1 | 2/2003 | Corbaton | 375/148 |
| 2003/0035469 A1 | 2/2003 | Frank et al. | |
| 2003/0050020 A1 | 3/2003 | Erceg | 455/101 |
| 2003/0053526 A1 | 3/2003 | Reznik | 375/148 |
| 2003/0086479 A1 | 5/2003 | Naguib | |
| 2003/0095590 A1 | 5/2003 | Fuller | |
| 2003/0156630 A1 | 8/2003 | Sriram | |
| 2003/0198201 A1 | 10/2003 | Ylitalo | 370/329 |
| 2003/0210667 A1 | 11/2003 | Zhengdi | |
| 2003/0219085 A1 | 11/2003 | Endres | |
| 2004/0001537 A1 | 1/2004 | Zhang et al. | |
| 2004/0008765 A1 | 1/2004 | Chung | |
| 2004/0013190 A1 | 1/2004 | Jayaraman | |
| 2004/0017867 A1 | 1/2004 | Thomas | 375/346 |
| 2004/0076224 A1 | 4/2004 | Onggosanusi et al. | |
| 2004/0095907 A1 | 5/2004 | Agee et al. | |
| 2004/0116078 A1 | 6/2004 | Rooyen et al. | |
| 2004/0136445 A1 | 7/2004 | Olson et al. | 375/316 |
| 2004/0146024 A1 | 7/2004 | Li et al. | |
| 2004/0146093 A1 | 7/2004 | Olson | 375/148 |
| 2004/0161065 A1 | 8/2004 | Buckley | |
| 2004/0165675 A1 | 8/2004 | Ito et al. | |
| 2004/0190601 A1 | 9/2004 | Papadimitriou | |
| 2004/0196892 A1 | 10/2004 | Reznik | 375/148 |
| 2004/0248515 A1 | 12/2004 | Molev Shteiman | |
| 2004/0264552 A1 | 12/2004 | Smee | |
| 2005/0002445 A1 | 1/2005 | Dunyak et al. | |
| 2005/0013349 A1 | 1/2005 | Chae et al. | |
| 2005/0084045 A1 | 4/2005 | Stewart | |
| 2005/0101259 A1 | 5/2005 | Tong et al. | |
| 2005/0111408 A1 | 5/2005 | Skillermark et al. | |
| 2005/0111566 A1 | 5/2005 | Park et al. | |
| 2005/0129107 A1 | 6/2005 | Park | |
| 2005/0152267 A1 | 7/2005 | Song et al. | |
| 2005/0157811 A1 | 7/2005 | Bjerke et al. | |
| 2005/0163196 A1 | 7/2005 | Currivan et al. | 375/144 |
| 2005/0180364 A1 | 8/2005 | Nagarajan | 370/335 |
| 2005/0185729 A1 | 8/2005 | Mills | |

(56) References Cited

U.S. PATENT DOCUMENTS

| | | | |
|---|---|---|---|
| 2005/0190868 A1 | 9/2005 | Khandekar et al. | |
| 2005/0195889 A1 | 9/2005 | Grant | 375/148 |
| 2005/0201499 A1 | 9/2005 | Jonsson | 375/348 |
| 2005/0213529 A1 | 9/2005 | Chow et al. | |
| 2005/0223049 A1 | 10/2005 | Regis | |
| 2005/0243908 A1 | 11/2005 | Heo | |
| 2005/0259770 A1 | 11/2005 | Chen | |
| 2005/0265465 A1 | 12/2005 | Hosur | |
| 2006/0007895 A1 | 1/2006 | Coralli et al. | |
| 2006/0013289 A1 | 1/2006 | Hwang | |
| 2006/0047842 A1 | 3/2006 | McElwain | |
| 2006/0078042 A1 | 4/2006 | Lee et al. | |
| 2006/0083202 A1 | 4/2006 | Kent et al. | |
| 2006/0125689 A1 | 6/2006 | Narayan et al. | |
| 2006/0126703 A1 | 6/2006 | Karna | |
| 2006/0141933 A1 | 6/2006 | Smee et al. | |
| 2006/0141934 A1 | 6/2006 | Pfister et al. | |
| 2006/0141935 A1 | 6/2006 | Hou et al. | |
| 2006/0142041 A1 | 6/2006 | Tomasin et al. | |
| 2006/0153283 A1 | 7/2006 | Scharf et al. | |
| 2006/0215781 A1 | 9/2006 | Lee et al. | |
| 2006/0227730 A1 | 10/2006 | McCloud | 370/286 |
| 2006/0227854 A1 | 10/2006 | McCloud | 375/148 |
| 2006/0227909 A1 | 10/2006 | Thomas et al. | |
| 2006/0229051 A1 | 10/2006 | Narayan | |
| 2006/0245509 A1 | 11/2006 | Khan et al. | |
| 2006/0251156 A1* | 11/2006 | Grant et al. | 375/148 |
| 2007/0153935 A1 | 7/2007 | Yang et al. | |

FOREIGN PATENT DOCUMENTS

| | | | |
|---|---|---|---|
| DE | 4326843 | 2/1995 | H04B 7/08 |
| DE | 4343959 | 6/1995 | H04B 7/08 |
| EP | 0610989 | 1/1994 | H04B 7/04 |
| EP | 1179891 | 2/2002 | H04B 1/707 |
| GB | 2280575 | 2/1995 | H04L 27/227 |
| JP | 2000-13360 | 1/2000 | H04J 13/04 |
| WO | WO 93/12590 | 6/1993 | H04B 7/26 |
| WO | WO 01/89107 | 11/2001 | H04B 1/707 |
| WO | WO 02/080432 | 10/2002 | |

OTHER PUBLICATIONS

Wang, Xiaodong et al., "Space-Time Multiuser Detection in Multipath CDMA Channels", IEEE Transactions on Signal Processing, vol. 47, No. 9, Sep. 1999. 19 Pages.

Marinkovic, Slavica et al., "Space-Time Iterative and Multistage Receiver Structures for CDMA Mobile Communications Systems", IEEE Journal on Selected Areas in Communications, vol. 19, No. 8, Aug. 2001. 11 Pages.

Jayaweera, Sudharman K. et al., "A RAKE-Based Iterative Receiver for Space-Time Block-Coded Multipath CDMA", IEEE Transactions on Signal Processing; vol. 52, No. 3, Mar. 2004. 11 Pages.

Mohamed, Nermin A. et al., "A Low-Complexity Combined Antenna Array and Interference Cancellation DS-CDMA Receiver in Multipath Fading Channels", IEEE Journal on Selected Areas in Communications, vol. 20, No. 2, Feb. 2002. 9 Pages.

Response dated May 13, 2010 to final Office Action mailed Apr. 19, 2010 re U.S. Appl. No. 11/272,411 includes Terminal Disclaimer. 6 Pages.

Notice of Allowance and Fee(s) Due with mail date of May 28, 2010 for U.S. Appl. No. 11/272,411. 7 pages.

Lin, Kun; Zhao, Kan; Chui, Edmund; Krone, Andrew; and Nohrden, Jim; "Digital Filters for High Performance Audio Delta-sigma Analog-to-Digital and Digital-to-Analog Conversions," Proceedings of ICSP '96, Crystal Semiconductor Corporation. Austin, TX, US. 5 pages.

Response dated Aug. 17, 2010 to the Final Office Action of Jun. 28, 2010, re U.S. Appl. No. 11/266,928. 47 pages.

PCT Notification of Transmittal of International Search Report and Written Opinion of International Searching Authority date of mailing Sep. 21, 2007, re Int'l Application No. PCT/US 06/36018. 10 pages.

Advisory Action Before the Filing of an Appeal Brief Office Action for reply filed Aug. 17, 2010, dated Sep. 1, 2010, in re U.S. Appl. No. 11/266,928. 2 pages.

Office Action dated May 6, 2007, with mail date of Jun. 28, 2010, re U.S. Appl. No. 11/266,928. 17 pages.

Notice of Allowance and Fees Due with mail date of Nov. 30, 2010 for U.S. Appl. No. 11/266,928 includes excerpt from Response to Final Office Action and Examiner's comments. 21 Pages.

Mitra, et al., "Adaptive Decorrelating Detectors for CDMA Systems," accepted for Wireless Communications Journal, accepted May 1995. 25 pages.

Schneider, "Optimum Detection of Code Division Multiplexed Signals," IEEE Transactions on Aerospace and Electronic Systems, vol. AES-15, No. 1, Jan. 1979.

Mitra, et al., "Adaptive Receiver Algorithms for Near-Far Resistant CDMA," IEEE Transactions on Communications, Apr. 1995.

Lupas, et al., "Near-Far Resistance of Multiuser Detectors in Asynchronous Channels," IEEE transactions on Communications, vol. 38, No. 4, Apr. 1990.

Lupas, et al., "Linear Multiuser Detectors for Synchronous Code-Division Multiple-Access Channels," IEEE Transactions on Information Theory, vol. 35, No. 1, Jan. 1989.

Kohno et al., "Cancellation Techniques of Co-Channel Interference in Asynchronous Spread Spectrum Multiple Access Systems," May 1983, vol. J 56-A, No. 5.

Garg, et al., "Wireless and Personal Communications Systems," Prentice Hall, Upper Saddle River, NJ, US, 1996. pp. 79-151.

Cheng, et al., "Spread-Spectrum Code Acquisition in the Presence of Doppler Shift and Data Modulation," IEEE Transactions on Communications, vol. 38, No. 2, Feb. 1990.

Behrens, et al., "Parameter Estimation in the Presence of Low Rank Noise," pp. 341-344, Maple Press, 1988.

Best, "Phase-Locked Loops—Design, Simulation, and Applications," McGraw-Hill, 1999. pp. 251-287.

Iitis, "Multiuser Detection of Quasisynchronous CDMA Signals Using Linear Decorrelators," IEEE Transactions on Communications, vol. 44, No. 11, Nov. 1996.

Rappaport, "Wireless Communications—Principles & Practice," Prentice Hall, Upper Saddle River, NJ, US. 1996, pp. 518-533.

Scharf, et al., "Matched Subspace Detectors," IEEE Transactions on Signal Processing, vol. 42, No. 8, Aug. 1994.

Price, et al., "A Communication Technique for Multipath Channels," Proceedings of the IRE, vol. 46, The Institute of Radio Engineers, New York, NY, US, 1958. 16 pages.

Affes, et al., "Interference Subspace Rejection: A Framework for Multiuser Detection in Wideband CDMA," IEEE Journal on Selected Areas in Communications, vol. 20, No. 2, Feb. 2002.

Schlegel, et al., "Coded Asynchronous CDMA and its Efficient Detection," IEEE Transactions on Information Theory, vol. 44, No. 7, Nov. 1998.

Xie, et al., "A Family of Suboptimum Detectors for Coherent Multiuser Communications," IEEE Journal on Selected Areas in Communications, vol. 8, No. 4, May 1990.

Viterbi, "Very Low Rate Convolutional Codes for Maximum Theoretical Performance of Spread-Spectrum Multiple-Access Channels," vol. 8, No. 4, May 1990.

Viterbi, "CDMA—Principles of Spread Spectrum Communication," Addison-Wesley, Reading, MA, US. 1995, pp. 11-75 and 179-233.

Verdu, "Mimimum Probability of Error for Asynchronous Gaussian Multiple-Access Channels," IEEE Transactions on Information Theory, vol. IT-32, No. 1, Jan. 1986.

Kalpan, "Understanding GPS—Principles and Applications," Artech House, Norwood MA, 1996, pp. 83-236.

Scharf, "Statistical Signal Processing—Detection, Estimation, and Time Series Analysis," Addison-Wesley, Reading, MA, US. 1990, pp. 23-75 and 103-178.

Stimson, "Introduction to Airborne Radar," 2nd Edition, SciTech publishing, Mendham, NJ, US, 1998, pp. 163-176 and 473-491. 40 pages.

Behrens et al., "Signal Processing Applications of Oblique Projection Operators," IEEE Transactions on Signal Processing, vol. 42, No. 6, Jun. 1994, pp. 1413-1424.

(56) References Cited

OTHER PUBLICATIONS

Alexander et al., "A Linear Receiver for Coded Multiuser CDMA," IEEE transactions on Communications, vol. 45, No. 5, May 1997.
Schlegel et al., "Multiuser Projection Receivers," IEEE Journal on Selected Areas in Communications, vol. 14, No. 8, Oct. 1996. 9 pages.
Halper, et al., "Digital-to-Analog Conversion by Pulse-Count Modulation Methods," IEEE Transactions on Instrumentation and Measurement, vol. 45, No. 4, Aug. 1996.
Ortega, et al., "Analog to Digital and Digital to Analog Conversion Based on Stochastic Logic," IEEE 0-7803-3026-9/95, 1995. 5 pages.
Frankel et al., "High-performance photonic analogue-digital converter," Electronic Letters, Dec. 4, 1997, vol. 33, No. 25, pp. 2096-2097. 2 pages.
Thomas, "Thesis for the Doctor of Philosophy Degree," UMI Dissertation Services, Jun. 28, 1996. Ann Arbor, MI, US.
Schlegel et al, "Projection Receiver: A New Efficient Multi-User Detector," IEEE 0-7803-2509-5/95, 1995, 5 pages.
Behrens, "Subspace Signal Processing in Structured Noise," UMI Dissertation Services, Ann Arbor, MI, US. Jun. 1990. 117 pages.
Non-Final Office Action dated Jul. 31, 2008 for U.S. Appl. No. 11/100,935 dated Apr. 7, 2005.
Response to Notice to File Corrected Application Papers dated May 19, 2010 re U.S. Appl. No. 12/731,960 (63 Pages).
D. Guo, et al., "Linear parallel interference cancellation in long-code CDMA," IEEE J. Selected Areas Commun., Dec. 1999, pp. 2074-2081, vol. 17., No. 12.
D. Guo, et al., "MMSE-based linear parallel interference cancellation in CDMA," inProceedings of IEEE Int. Symp. Spread Spectrum Techniques and Appl., Sep. 1998, pp. 917-921.
L. Rassmussen, et al., "Convergence behaviour of linear parallel cancellation in CDMA," IEEE Global Telecom. Conf. (San Antonio, Texas), Dec. 2001, pp. 3148-2152.
D. Guo, et al., "A Matrix-Algebraic Approach to Linear Parallel Interference Cancellation in CDMA," IEEE Trans. Commun., Jan. 2000, pp. 152-161, vol. 48., No. 1.
L. Rasmussen, et al., "Ping-Pong Effects in Linear Parallel Interference Cancellation for CDMA," IEEE Trans. Wireless Commun., Mar. 2003, pp. 357-363, vol. 2., No. 2.
T. Lin, et al., "Iterative Multiuser Coding with Maximal Ratio Combining," Australian Workshop on Commun. Theory, (Newcastle, Australia), Feb. 2004, pp. 42-46.
T. Lin et al., "Truncated Maximal Ratio Combining for Iterative Multiuser Decoding," Australian Workshop on Commun. Theory, (Brisbane, Australia), Feb. 2005.
X. Wang, et al., "Iterative (Turbo) Soft Interference Cancellation and Decoding for Coded CDMA," IEEE Transactions on Communications, Jul. 1999, pp. 1046-1061, vol. 47, No. 7.
D. Divsalar, et al., "Improved Parallel Interference Cancellation for CDMA," IEEE Trans. on Comm., Feb. 1998, pp. 258-268, vol. 46, No. 2.
M. Ali-Hackl, et al., "Error Vector Magnitude as a Figure of Merit for CDMA Receiver Design," The 5th European Wireless Conf., Feb. 2004.
J. Robler, et al., "Matched-Filter-and MMSE-Based Iterative Equalization with Soft Feedback for QPSK Transmission," International Zurich Seminar on Broadband Communications (IZS '02) pp. 19-1-19-6, Feb. 2002.
Lin, et al., Digital Filters for High Performance Audio Delta-sigma Analog-to-digital and Digital-to-analog Conversions, Proceedings of ICSP, Crystal Semiconductor Corporation, 1996, Austin, TX, US.
D. Brown, et al., "On the Performance of Linear Parallel Interference Cancellation," IEEE Trans. Information Theory, V. 47, No. 5, Jul. 2001, pp. 1957-1970.
M. Kobayashi, et al., "Successive Interference Cancellation with SISO Decoding and EM Channel Estimation," IEEE J. Sel. Areas Comm., V. 19, No. 8, Aug. 2001, pp. 1450-1460.
J. Proakis, Digital Communications (4th ed. 2000), pp. 622-626, 956-959.
P. Naidu, Modern Digital Signal Procesing: An Introduction (2003), pp. 124-126.
S. Verdu, Multiuser Detection (1998), pp. 291-306.
G. Xue, et al., "Adaptive Multistage Parallel Interference Cancellation for CDMA over Multipath Fading Channels," IEEE J. on Selected Areas in Comm. Oct. 1999, V. 17, No. 10.
K. Hooli, et al., "Chip-Level Channel Equalization in WCDMA Downlink," Eurasip J. on Applied Signal Processing 2002:8, pp. 757-770.
L. Rasmussen, et al., "A Matrix-Algebraic Approach to Successive Interference Cancellation in CDMA," IEEE Trans. Comm, Jan. 2000, V. 48, No. 1, pp. 145-151.
P. Tan, et al. "Linear interference Cancellation in CDMA Based on Iterative Techniques for Linear Equation Systems," IEEE Trans. Comm., Dec. 2000, V. 48, No. 12, pp. 2099-2108.
A. Yener, et al., "CDMA Multiuser Detection: A Nonlinear Programming Approach," IEEE Trans. Comm, Jun. 2002, V. 50, No. 6, pp. 1016-1024.
A. Persson, et al., "Time-Frequency Localization CDMA for Downlink Multi-Carrier Systems," 2002 IEEE 7th Int. Symp. Spread Spectrum, 2002, vol. 1, pp. 118-122.
H. Ping, et al. "Decision-Feedback Blind Adaptive Multiuser Detector for Synchronous CDMA System," IEEE Trans. Veh. Tech., Jan 2000, V. 49, No. 1, pp. 159-166.
H. Dai, et al., "Iterative Space-Time Processing for Multiuser Detection in Multipath CDMA Channels," IEEE Trans. Signal Proc., Sep. 2002, V. 50, N. 6.
Y Guo, "Advanced MIMO-CDMA Receiver for Interference Suppression: Algorithms, System-on-Chip Architecture and Design Methodology," PhD Thesis, Rice U., May 2005, pp. 165-185.
S. Kim, et al., "Adaptive Weighted Parallel Interference Cancellation for CDMA Systems," Electronic Letters, Oct. 29, 1998, V. 34, N. 22.
H. Yan, et al., "Paralle Interference Cancellation for Uplink Multirate Overlay CDMA Channels," IEEE Trans. Comm. V. 53, No. 1, Jan. 2005, pp. 152-161.
J. Winters, "Optimal Combining in Digital Mobile Radio with Cochannel Interference," IEEE J. Selected Areas in Comm., V SAC-2, No. 4, Jul. 1984, pp. 538-539.
D. Athanasios, et al., "SNR Estimation Algorighms in AWGN for HiperLAN/2 Transceiver," MWCN 2005 Morocco, Sep. 19-21, 2005.
D. Divsalar, "Improved Parallel Interference Cancellation for CDMA," IEEE Trans., Comm., V. 46, No. 2, Feb. 1998, pp. 258-268.
T. Lim, S. Roy, "Adaptive filters in multiuser (MU) CDMA detection," Wireless Networks 4 (1998) pp. 307-318.
D. Guo, et al , "A Matrix-Algebraic Approach to Linear Parallel Interference Cancellation in CDMA," IEEE TRans. Comm., V. 48, No. 1, Jan. 2000, pp. 152-161.
L. Rasmussen, et al., "A Matrtix-Algebraic Approach to Successive Interference Cancellation in CDMA," IEEE Trans. Comm., V. 48, No. 1, Jan. 2000, pp. 145-151.
D. Guo, et al., "Linear Parallel Interference Cancellation in Long-Code CDMA Multiuser Detection," IEEE J. Sel. Areas Comm., V. 17, No. 12, Dec. 1999, pp. 2074-2081.

\* cited by examiner

ITERATIVE INTERFERENCE SUPPRESSOR FOR WIRELESS MULTIPLE-ACCESS SYSTEMS WITH MULTIPLE RECEIVE ANTENNAS

CROSS-REFERENCE TO RELATED APPLICATIONS

This application is a continuation of U.S. patent application Ser. No. 14/520,626, entitled "Iterative Interference Suppressor for Wireless Multiple-Access Systems with Multiple Receive Antennas," filed Oct. 22, 2014, which is a continuation of U.S. patent application Ser. No. 13/896,952, entitled "Iterative Interference Suppressor for Wireless Multiple-Access Systems with Multiple Receive Antennas," filed May 17, 2013, now U.S. Pat. No. 8,879,658, which is a continuation of U.S. patent application Ser. No. 13/372,483, entitled "Iterative Interference Suppressor for Wireless Multiple-Access Systems with Multiple Receive Antennas," filed Feb. 13, 2012, now U.S. Pat. No. 8,446,975, which is a continuation of U.S. patent application Ser. No. 12/916,389, entitled "Iterative Interference Canceler for Wireless Multiple-Access Systems with Multiple Receive Antennas," filed Oct. 29, 2010, now U.S. Pat. No. 8,121,176, which is a continuation of U.S. patent application Ser. No. 11/491,674, entitled "An Iterative Interference Canceller for Wireless Multiple-Access Systems with Multiple Receive Antennas," filed Jul. 24, 2006, now U.S. Pat. No. 7,826,516[M], which (1) is a Continuation in Part of U.S. patent application Ser. No. 11/451,932, filed Jun. 13, 2006, and entitled "Iterative Interference Cancellation Using Mixed Feedback Weights and Stabilizing Step Sizes," now U.S. Pat. No. 7,711,075 and (2) claims priority to U.S. Patent Application Ser. No. 60/736,204, filed Nov. 15, 2005, and entitled "Iterative Interference Cancellation Using Mixed Feedback Weights and Stabilizing Step Sizes," which incorporates by reference (a) U.S. patent application Ser. No. 11/100,935, filed Apr. 7, 2005, entitled "Construction of Projection Operators for Interference Cancellation," published as U.S. Patent Application Publication Number US 2005/0180364 A1, (b) U.S. patent application Ser. No. 11/233,636, filed Sep. 23, 2005, entitled "Optimal Feedback Weighting for Soft-Decision Cancellers," published as U.S. Patent Application Publication Number US 2006/0227909 A1, and (c) U.S. patent application Ser. No. 11/266,928, filed Nov. 4, 2005, entitled "Soft Weighted Subtractive Cancellation for CDMA Systems," now U.S. Pat. No. 7,876,810. The entirety of each of the foregoing patents, published patent applications and patent applications is incorporated by reference herein in its entirety.

BACKGROUND

1. Field of the Invention

The present invention relates generally to suppression of intra-channel and inter-channel interference in coded spread spectrum wireless communication systems with multiple receive antennas. More specifically, the invention takes advantage of the receive diversity afforded by multiple receive antennas in combination with multiple uses of an interference-suppression unit consisting of symbol-estimate weighting, subtractive suppression with a stabilizing step-size, and a mixed-decision symbol estimator.

2. Discussion of the Related Art

In an exemplary wireless multiple-access system, a communication resource is divided into code-space sub channels allocated to different users. A plurality of sub channel signals received by a wireless terminal (e.g., a subscriber unit or a base station) may correspond to different users and/or different sub channels allocated to a particular user.

If a single transmitter broadcasts different messages to different receivers, such as a base station in a wireless communication system serving a plurality of mobile terminals, the channel resource is subdivided in order to distinguish between messages intended for each mobile. Thus, each mobile terminal, by knowing its allocated sub channel(s), may decode messages intended for it from the superposition of received signals. Similarly, a base station typically separates signals it receives into sub channels in order to differentiate between users.

In a multi path environment, received signals are superpositions of time-delayed and complex-scaled versions of the transmitted signals. Multi path can cause several types of interference. Intra-channel interference occurs when the multi path time-spreading causes sub channels to leak into other sub channels. For example, forward-link sub channels that are orthogonal at the transmitter may not be orthogonal at the receiver. When multiple base stations (or sectors or cells) are active, inter-channel interference may result from unwanted signals received from other base stations. These types of interference can degrade communications by causing a receiver to incorrectly decode received transmissions, thus increasing a receiver's error floor. Interference may degrade communications in other ways. For example, interference may diminish the capacity of a communication system, decrease the region of coverage, and/or decrease maximum data rates. For these reasons, a reduction in interference can improve reception of selected signals while addressing the aforementioned limitations due to interference. Multiple receive antennas enable the receiver to process more information, allowing greater interference-reduction than can be accomplished with a single receive antenna.

In code division multiple access (such as used in CDMA 2000, WCDMA, EV-DO (in conjunction with time-division multiple access), and related standards), a set of symbols is sent across a common time-frequency slot of the physical channel and separated by the use of a set of distinct code waveforms, which are usually chosen to be orthogonal (or pseudo-orthogonal for reverse-link transmissions). The code waveforms typically vary in time, with variations introduced by a pseudo-random spreading code (PN sequence). The wireless transmission medium is characterized by a time-varying multi path profile that causes multiple time-delayed replicas of the transmitted waveform to be received, each replica having a distinct amplitude and phase due to path loss, absorption, and other propagation effects. As a result, the received code set is no longer orthogonal. Rather, it suffers from intra-channel interference within a base station and inter-channel interference arising from transmissions in adjacent cells.

SUMMARY OF THE INVENTION

In view of the foregoing background, embodiments of the present invention may provide a generalized interference-suppressing receiver for suppressing intra-channel and inter-channel interference in multiple-access coded-waveform transmissions that propagate through frequency-selective communication channels and are received by a plurality of receive antennas. Receiver embodiments may be designed, adapted, and implemented explicitly in software or pro-grammed hardware, or implicitly in standard RAKE-based hardware. Embodiments may be employed in user equipment on the downlink or in a base station on the uplink.

An interference-suppression system configured for suppressing at least one of inter-cell and intra-cell interference in multiple-access communication signals received from a plurality of antennas comprises a front-end processing means coupled to an iterative interference-suppression means.

A front-end processing means is configured for generating initial symbol estimates to be coupled to an iterative interference-suppression means. The front-end processing means may include, by way of example, but without limitation, a combiner configured for combining received signals from each of a plurality of transmission sources across a plurality of antennas for producing combined signals, a despreader configured for resolving the combined signals onto a signal basis for the plurality of transmission sources to produce soft symbol estimates from the plurality of transmission sources, and a symbol estimator configured for performing a mixed decision on each of the soft symbol estimates to generate the initial symbol estimates.

In one embodiment, the front-end processing means may further comprise a synthesizer configured for synthesizing estimated Rake finger signals for each antenna that would be received if weighted symbol decisions were employed at the plurality of transmission sources, and a subtraction module configured for performing per-antenna subtraction of a sum of synthesized Rake finger signals from that antenna's received signal to produce an error signal.

In another embodiment, the front-end processing means may further comprise a despreader configured for resolving each of a plurality of error signals corresponding to each of a plurality of antennas onto a signal basis for the plurality of transmission sources for producing a plurality of resolved error signals, a first combiner configured for combining the resolved error signals across antennas for producing a combined signal, a stabilizing step-size module configured to scale the combined signal by a stabilizing step size for producing a scaled signal, and a second combiner configured for combining the combined signal with a weighted input vector.

An iterative interference-suppression means may include, by way of example, but without limitation, a sequence of interference-suppression units. In one embodiment, each interference-suppression unit is configured for processing signals received by each of the plurality of antennas, whereby constituent signals for each of a plurality of antennas are added back to corresponding scaled error signals to produce error signals for a plurality of transmission sources, followed by resolving the error signals for the plurality of transmission sources across the plurality of antennas onto a signal basis for the plurality of transmission sources.

In one embodiment, each interference-suppression unit may comprise a soft-weighting module configured to apply weights to a plurality of input symbol decisions to produce weighted symbol decisions, a synthesizer corresponding to each antenna of the plurality of antennas and configured for synthesizing constituent signals, a subtractive suppressor configured to perform a per-antenna subtraction of the synthesized signal from the received signal to produce a plurality of per-antenna error signals, a stabilizing step size module configured for scaling the plurality of antenna error signals by a stabilizing step size for producing a plurality of scaled error signals, a combiner configured for combining each of the constituent signals with its corresponding scaled error signal to produce a plurality of interference-suppressed constituents, a resolving module configured for resolving each of the interference-suppressed constituent signals onto a signal basis for a plurality of transmit sources to produce the interference-suppressed input symbol decisions, and a mixed-decision module configured for processing the interference-suppressed symbol decisions to produce the updated symbol decisions.

Embodiments of the invention may be employed in any receiver configured to support the standard offered by the 3rd-Generation Partnership Project 2 (3GPP2) consortium and embodied in a set of documents, including "TR-45.5 Physical Layer Standard for cdma2000 Spread Spectrum Systems," "C.S0005-A Upper Layer (Layer 3) Signaling Standard for cdma2000 Spread Spectrum Systems," and "C.S0024 CDMA2000 High Rate Packet Data Air Interface Specification" (i.e., the CDMA2000 standard).

Receivers and suppression systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or suppression functionality of the embodiments described herein.

Various functional elements, separately or in combination as depicted in the figures, may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or a discrete hardware unit.

These and other embodiments of the invention are described with respect to the figures and the following description of the preferred embodiments.

BRIEF DESCRIPTION OF THE DRAWINGS

Embodiments according to the present invention are understood with reference to the following figures.

Various functional elements or steps, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or discrete hardware unit.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The following formula represents an analog baseband signal received from multiple base stations by antenna a of a receiver, $$y_a(t) = \sum_{s=1}^{B} \sum_{l=1}^{L_{a,s}} \alpha_{a,s,l} \sum_{k=1}^{K_s} b_{s,k} u_{s,k}(t - \tau_{a,s,l}) + w_a(t), t \in (0,T),$$ Equation 1 with the following definitions a represents an $a^{th}$ antenna of a mobile and ranges from 1 to A;

(0, T) is a symbol interval;

B is a number of modeled base stations, which are indexed by subscript s, which ranges from 1 to B. The term "base station" may be used herein to convey cells or sectors;

$L_{a,s}$ is the number of resolvable (or modeled) paths from base station s to antenna a of the mobile, and is indexed from 1 to $L_{a,s}$;

$\alpha_{a,s,l}$ and $\tau_{a,s,l}$ are, respectively, the complex gain and delay associated with an $l^{th}$ path from base station s to antenna a of the mobile;

$K_s$ represents a number of active sub channels in base station s that employ code division multiplexing to share the channel. The sub channels are indexed from 1 to $K_s$;

$u_{s,k}(t)$ is a code waveform (e.g., spreading waveform) used to carry a $k^{th}$ sub channel's symbol for an $s^{th}$ base station (e.g., a chip waveform modulated by a sub channel-specific Walsh code and covered with a base-station specific PN cover);

$b_{s,k}$ is a complex symbol being transmitted for the $k^{th}$ sub channel of base station s; and $w_a(t)$ denotes zero-mean complex additive noise on the $a^{th}$ antenna. The term $w_a(t)$ may include thermal noise and any interference whose structure is not explicitly modeled (e.g., inter-channel interference from unmodeled base stations, and/or intra-channel interference from unmodeled paths).

Figure 1:
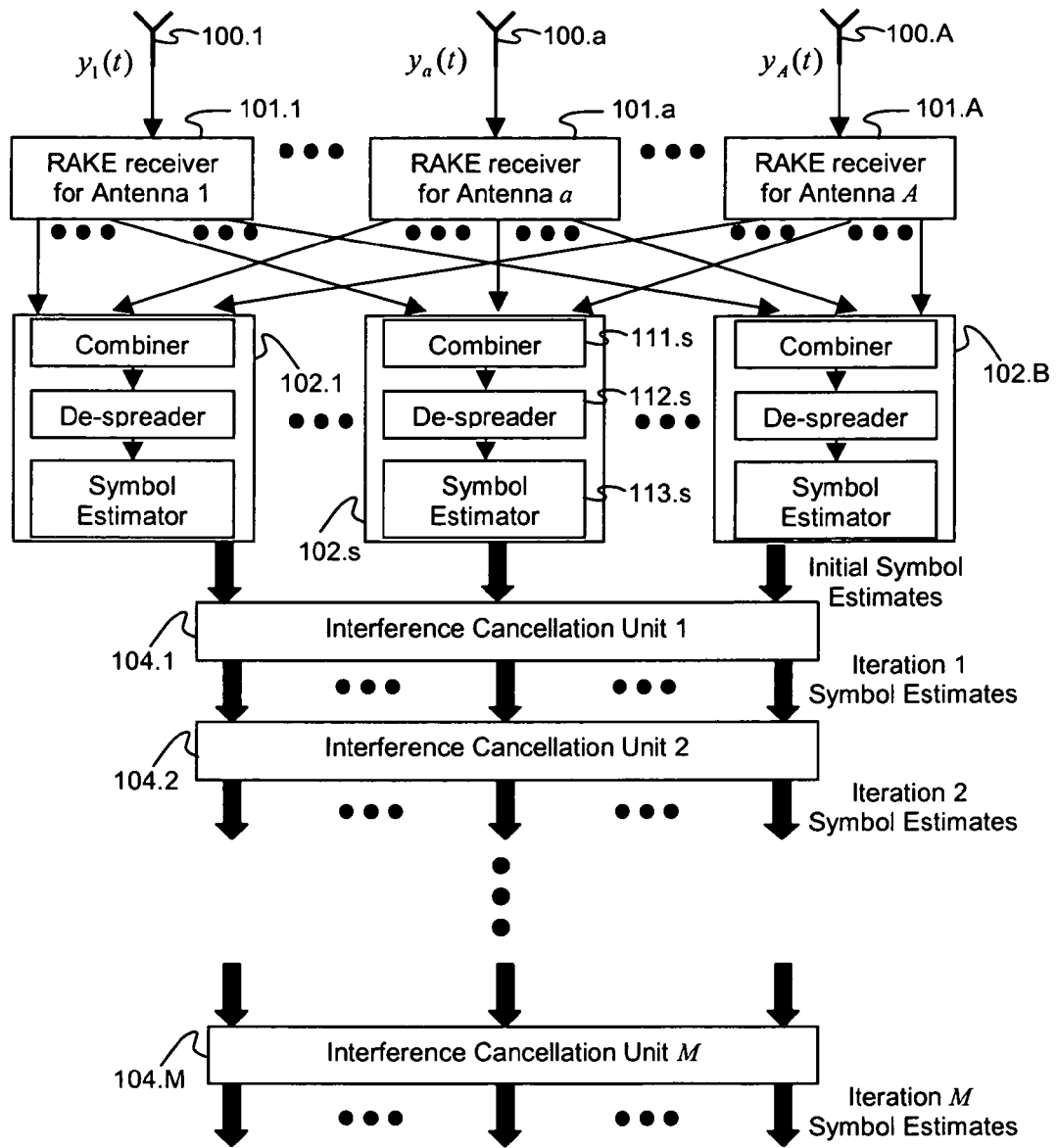
FIG. 1 is a general schematic illustrating an iterative interference suppressor for multiple receive antennas.

FIG. 1 illustrates an iterative interference suppressor in accordance with one embodiment of the invention. Received signals from each of a plurality of antennas 100.1-100.A are processed by corresponding RAKE receivers 101.1-101.A. Each RAKE receiver 101.1-101.A may comprise a maximal ratio combiner (not shown).

Multi path components received by each RAKE receiver 101.1-101.A are separated with respect to their originating base stations and processed by a plurality B of constituent-signal analyzers 102.1-102.B. Each constituent-signal analyzer 102.1-102.B comprises a combiner, a despreader, and a symbol estimator, such as combiner 111.s, despreader 112.s, and symbol estimator 113.s in constituent-signal analyzer 102.s.

Signals received from different antennas 100.1-100.A corresponding to an $s^{th}$ originating base station are synchronized, and then combined (e.g., maximal ratio combined) by combiner 111.s to produce an $s^{th}$ diversity-combined signal. The despreader 112.s resolves the $s^{th}$ diversity-combined signal onto sub channel code waveforms, and the symbol estimator 113.s produces initial symbol estimates, which are input to a first interference suppression unit (ICU) 104.1 of a sequence of ICUs 104.1-104.M.

ICU 104.1 mitigates intra-channel and/or inter-channel interference in the estimates in order to produce improved symbol estimates. Successive use of ICUs 104.2-104.M further improves the symbol estimates. The ICUs 104.1-104.M may comprise distinct units, or a single unit configured to perform each iteration.

Figure 2:
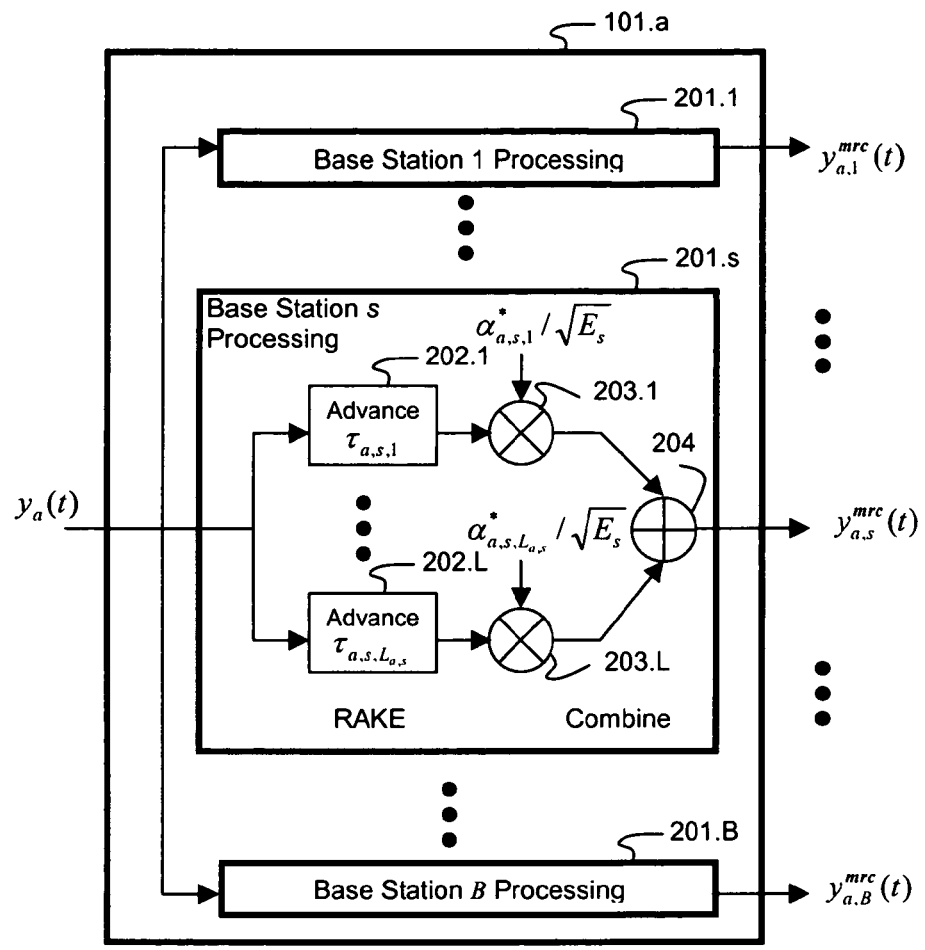
FIG. 2 is a block diagram illustrating a per-antenna front-end RAKE and combiner.

FIG. 2 is a block diagram of a Rake receiver, such as RAKE receiver 101.a. One of a plurality of processors 201.1-201.B is associated with each base station. For example, processor 201.s associated with an $s^{th}$ base station comprises a plurality L of time-advance modules 202.1-202.L configured to advance the received signal in accordance with L multi path time offsets. Weighting modules 203.1-203.L provide corresponding maximal-ratio combining weights $\alpha_{a,s,l}$ to the time-advanced signals, and a combiner 204 combines the weighted signals to produce an output for the $a^{th}$ antenna $$y_{a,s}^{mrc}(t) = \frac{1}{\sqrt{E_s}} \sum_{l=1}^{L_{a,s}} \alpha_{a,s,l}^* y_a(t - \tau_{a,s,l}),$$ Equation 2 where $E_s = \sum_{l=1}^{L_{a,s}} |\alpha_{a,s,l}|^2$.

Figure 3:
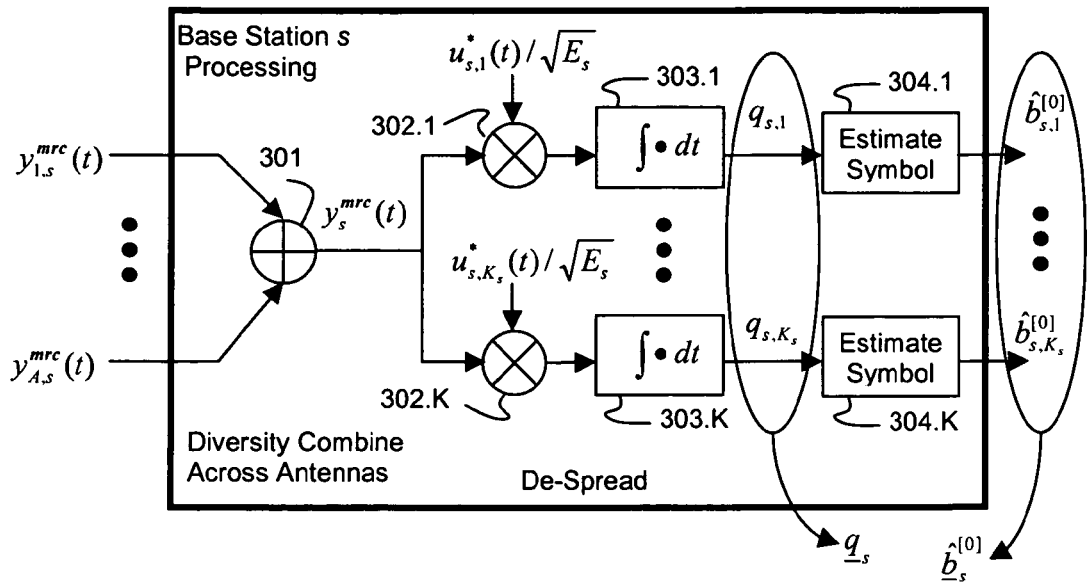
FIG. 3 is a block diagram illustrating a per base-station front-end combiner configured for combining like base-station signals across antennas, a de-spreading module, and an initial symbol decision module.

FIG. 3 is a block diagram of an exemplary constituent-signal analyzer, such as constituent-signal analyzer 102.s shown in FIG. 1. A combiner 301 for a given base station sums the signals over the plurality A of antennas to produce a combined signal for base station s over all paths and all antennas $$y_s^{mrc}(t) = \sum_{a=1}^{A} y_{a,s}^{mrc}(t).$$ Equation 3

The combined signal is resolved onto sub channel code waveforms by a plurality K of despreading modules, comprising K code-waveform multipliers 302.1-302.K and integrators 303.1-303.K, to give $$q_{s,k} \equiv \frac{1}{E_s} \int_0^T u_{s,k}^*(t) y_s^{mrc}(t) dt$$ Equation 4 as a RAKE/Combine/De-Spread output for the $k^{th}$ sub channel of base station s. A column vector of these outputs is denoted $$\underline{q}_s = [q_{s,1}\, q_{s,2} \cdots q_{s,K_s}]^T \quad \text{Equation 5}$$

for base station s, where the superscript T denotes matrix transpose. Each $q_{s,k}$ is processed by one of a plurality of symbol estimators 304.1-304.K to produce $$\hat{b}_{s,k}^{[0]} = \text{Estimate Symbol}\, \{q_{s,k}\}, \quad \text{Equation 6}$$

where the superscript [0] indicates the initial symbol estimate produced by front-end processing. Symbol estimators 304.1-304.K may include mixed-decision symbol estimators described in U.S. Patent Application Ser. No. 60/736,204, or other types of symbol estimators. An output vector of symbol estimates for base station s may be formed as $$\underline{\hat{b}}_{s,k}^{[0]} = [\hat{b}_{s,1}^{[0]} \hat{b}_{s,2}^{[0]} \ldots \hat{b}_{s,K_s}^{[0]}]^T.$$

It should be appreciated that one or more of the functions described with respect to FIG. 3 may be implemented on discrete-time sequences generated by sampling (or filtering and sampling) continuous waveforms. More specifically, time advances (or delays) of waveforms become shifts by an integer number of samples in discrete-time sequences, and integration becomes summation.

Figure 4:
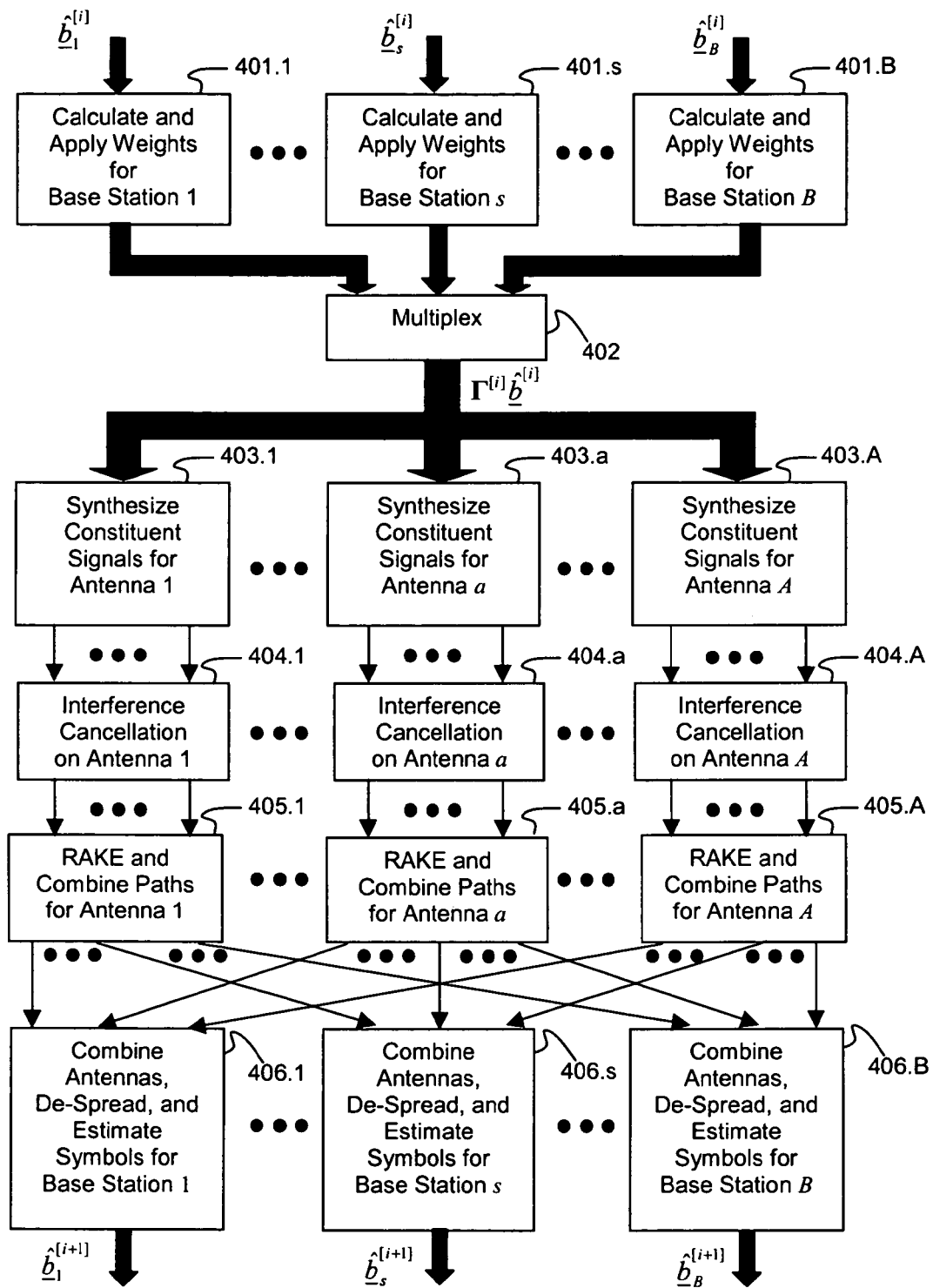
FIG. 4 is a general schematic of an ICU configured to process signals from multiple receive antennas.

FIG. 4 is a flow chart illustrating a functional embodiment of an ICU, such as one of the ICUs 104.1-104.M. Similar ICU embodiments are described in U.S. Patent Application Ser. No. 60/736,204 for a system with a single receive antenna. However, the embodiment shown in FIG. 4 conditions a plurality of received antenna signals for a parallel bank of ICUs and conditions ICU outputs prior to making symbol estimates. Symbol estimates for a plurality of sources are input to the ICU and weighted 401.1-401.B according to perceived merits of the symbol estimates. Any of the soft-weighting methods described in U.S. Patent Application Ser. No. 60/736,204 may be employed. The weighting of a $k^{th}$ sub channel of base station s is expressed by $$\gamma_{s,k}^{[i]} \hat{b}_{s,k}^{[i]} \quad \text{Equation 7}$$

where $\hat{b}_{s,k}^{[i]}$ is the input symbol estimate, $\gamma_{s,k}^{[i]}$ is its weighting factor, and superscript [i] represents the output of the $i^{th}$ ICU. The superscript [0] represents the output of front-end processing prior to the first ICU. The symbol estimates may be multiplexed (e.g., concatenated) 402 into a single column vector $$\underline{\hat{b}}^{[i]} = [(\underline{\hat{b}}_1^{[i]})^T (\underline{\hat{b}}_2^{[i]})^T \ldots (\underline{\hat{b}}_B^{[i]})^T]^T$$

such that the weighted symbol estimates are given by $\Gamma^{[i]} \underline{\hat{b}}^{[i]}$, where $\Gamma^{[i]}$ is a diagonal matrix containing the weighting factors along its main diagonal. The weighted symbol estimates are processed by a synthesizer used to synthesize 403.1-403.A constituent signals for each antenna. For each antenna, a synthesized signal represents a noise-free signal that would have been observed at antennas a with the base stations transmitting the weighted symbol estimates $\Gamma^{[i]} \underline{\hat{b}}^{[i]}$ over the multi path channels between base stations 1 through B and the mobile receiver.

For each antenna, a subtraction module performs interference suppression 404.1-404.A on the constituent signals to reduce the amount of intra-channel and inter-channel interference. The interference-suppressed constituents are processed via per-antenna RAKE processing and combining 405.1-405.A to produce combined signals. The combined signals are organized by base station, combined across antennas, resolved onto the sub channel code waveforms, and processed by symbol estimators 406.1-406.B. The terms $\hat{b}_{s,k}^{[i+1]}$ denote the estimated symbol for the $k^{th}$ sub channel of base station s after processing by the $(i+1)^{th}$ ICU.

Figure 5A:
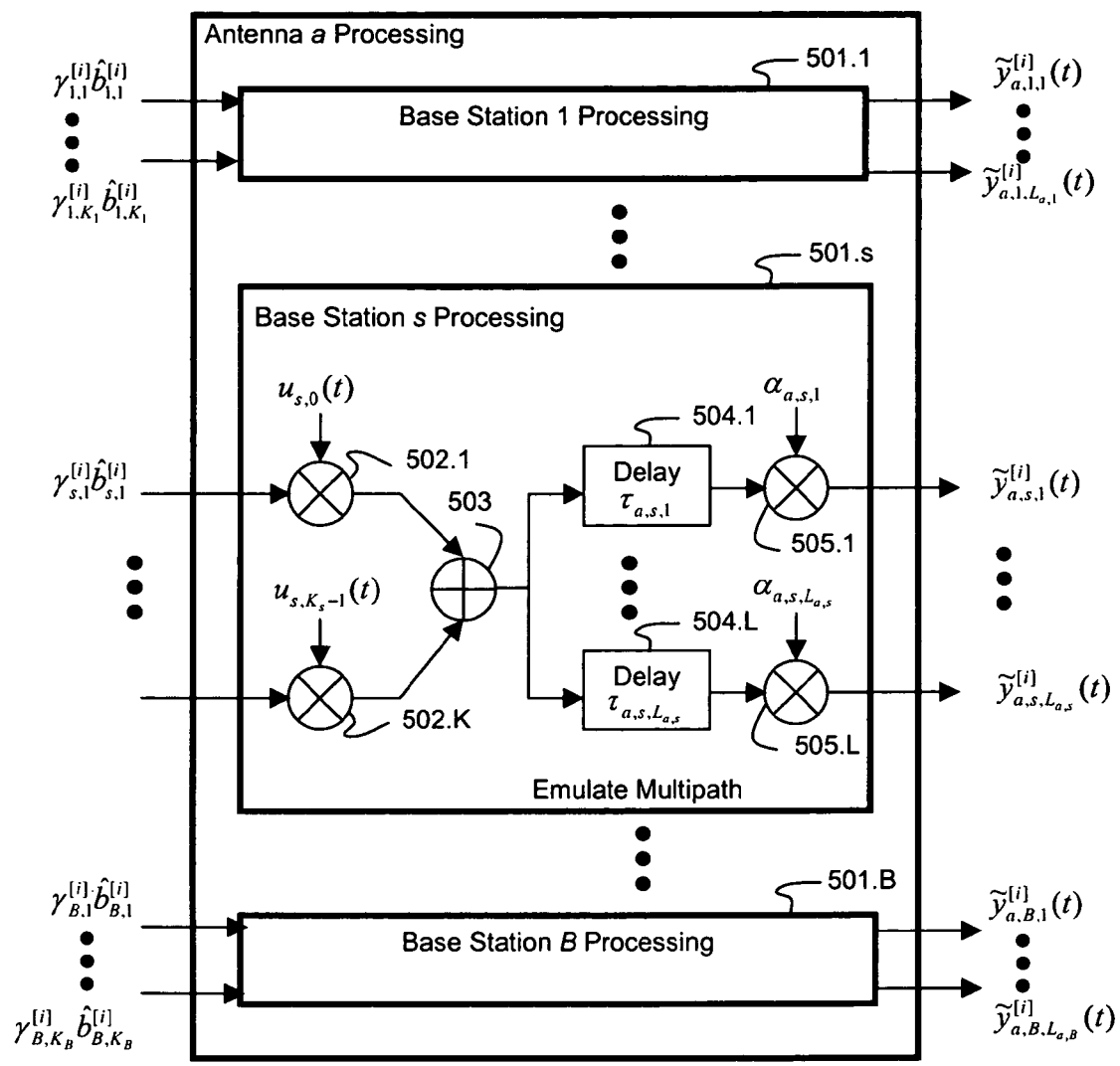
FIG. 5a is a per-antenna block diagram illustrating part of an interference-suppression unit that synthesizes constituent finger signals.
Figure 5B:
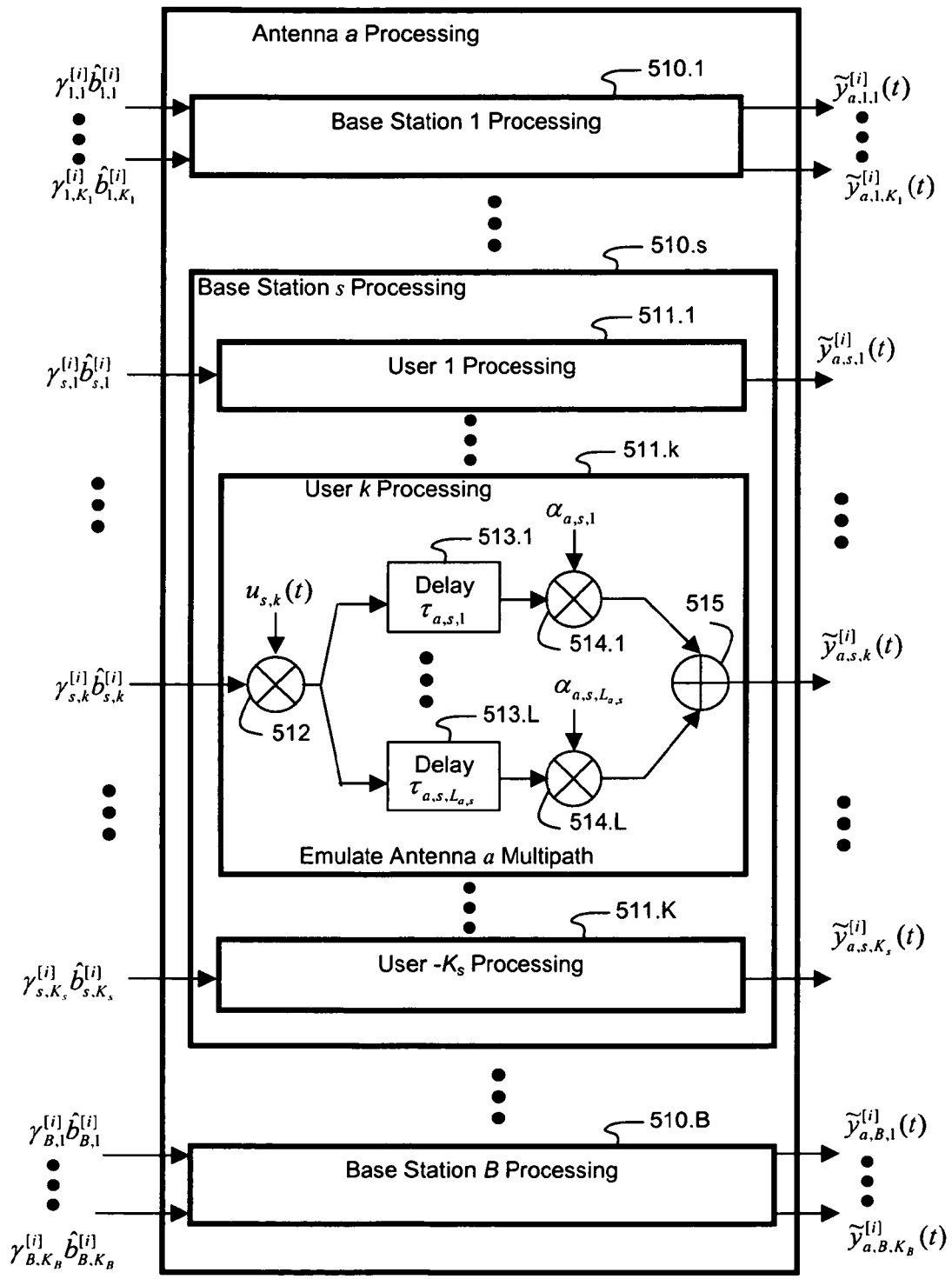
FIG. 5b is a per-antenna block diagram illustrating part of an interference-suppression unit that synthesizes constituent sub channel signals.

FIG. 5a illustrates an apparatus configured for generating multi path finger constituent signals and FIG. 5b shows an apparatus configured for generating sub channel constituents. A plurality of processors 501.1-501.B is configured for processing signals received from each base station. For an $s^{th}$ base station, a plurality $K_s$ of multipliers 502.1-502.K scales each code waveform with a corresponding weighted symbol estimate to produce a plurality of estimated transmit signals, which are combined by combiner 503 to produce a superposition signal $$\Sigma_{k=0}^{K_s-1} \gamma_{s,k}^{[i]} \hat{b}_{s,k}^{[i]} u_{s,k}(t) \quad \text{Equation 8}$$

A multi path channel emulator comprising path-delay modules 504.1-504.L and path-gain modules 505.1-505.L produces multi path finger constituent signals expressed by $$\tilde{y}_{a,s,l}^{[i]}(t) = \alpha_{a,s,l} \Sigma_{k=0}^{K_s-1} \gamma_{s,k}^{[i]} \hat{b}_{s,k}^{[i]} u_{s,k}(t-\tau_{a,s,l}), \quad \text{Equation 9}$$

where $\tilde{y}_{a,s,l}^{[i]}(t)$ is the $l^{th}$ finger constituent for the channel between base station s and antenna a.

FIG. 5b shows an apparatus configured for generating sub channel constituents. For a particular antenna a, a processor 510.1-510.B is configured for processing signals received from each base station. Within each base station processor 510.1-510.B, a plurality of processors 511.1-511.K are configured for processing each sub channel. Each sub channel processor 511.1-511.K comprises a multiplier 512 that scales a $k^{th}$ code waveform with a corresponding weighted symbol estimate to produce an estimated transmit signal, which is processed by a multi path channel emulator comprising path delay modules 513.1-513.L path-gain modules 514.1-514.L, and a combiner of the multiple paths 515 to produce $$\tilde{y}_{a,s,k}^{[i]}(t) = \gamma_{s,k}^{[i]} \hat{b}_{s,k}^{[i]} \Sigma_{l=0}^{L_{a,s}} \alpha_{a,s,l} u_{s,k}(t-\tau_{a,s,l}), \quad \text{Equation 10}$$

which is the synthesized constituent signal for the $k^{th}$ sub channel of base station s at the $a^{th}$ antenna of the mobile. Note that while Equation 9 and Equation 10 both show a signal with a three-parameter subscript for their left-hand sides, they are different signals; the subscript l (as in Equation 9) will be reserved for a finger constituent and the subscript k (as in Equation 10) will be reserved for a sub channel constituent.

Figure 6:
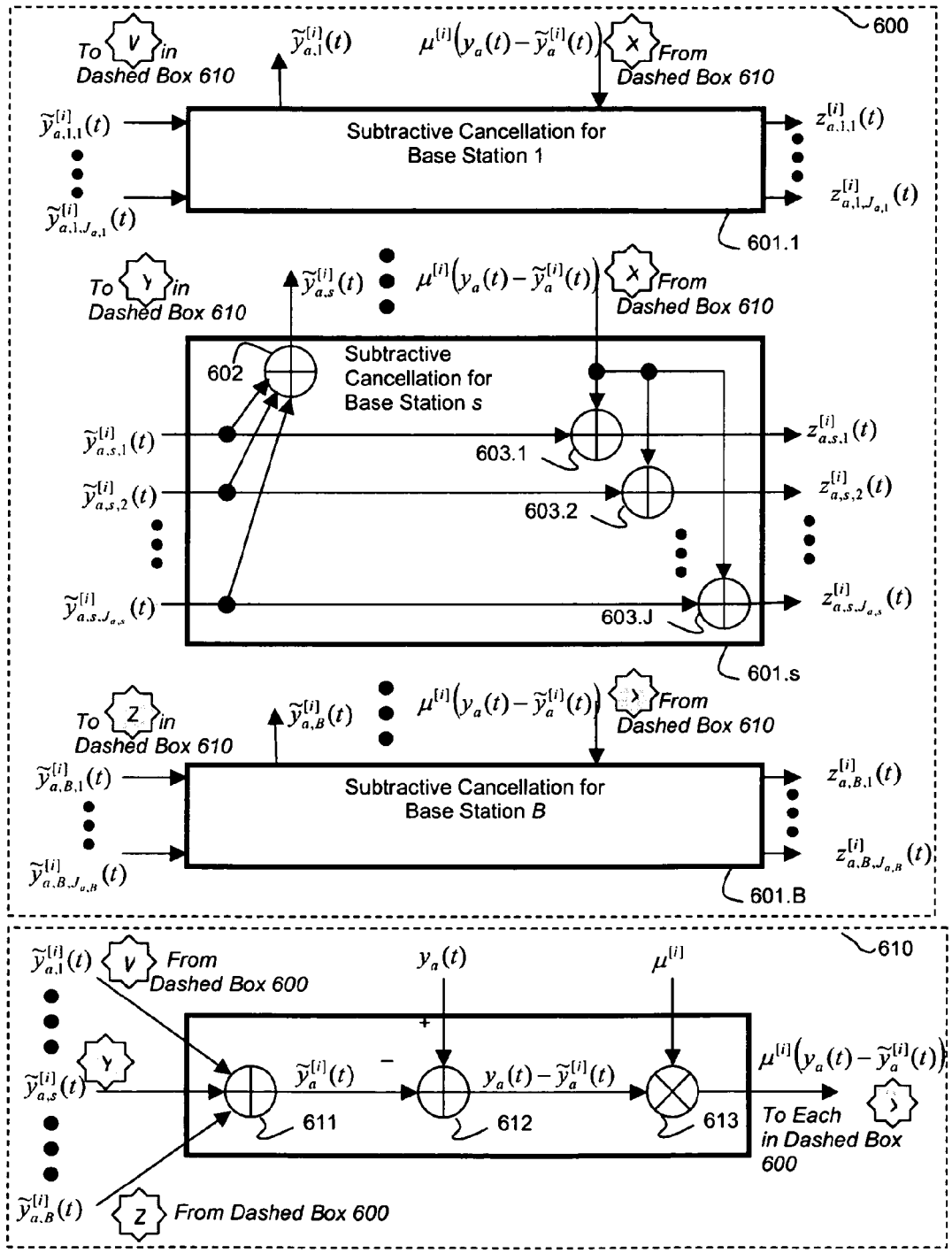
FIG. 6 is a block diagram of a subtractive suppressor in which suppression is performed prior to signal despreading.

FIG. 6 is a block diagram showing an apparatus configured for performing interference suppression on synthesized constituent signals for each antenna. Since, the constituent signals for each antenna a may comprise multi path finger constituents or sub channel constituents. The index $j \in \{1, \ldots, J_{a,s}\}$ is introduced, where $$J_{a,s} = \begin{cases} L_{a,s} & \text{for finger constituents} \\ K_s & \text{for subchannel constituents} \end{cases}$$

A first processor 600 comprises a plurality B of subtractive suppressors 601.1-601.B configured for processing constituent signals relative to each of a plurality B of base stations.

Suppressor 601.s is illustrated with details that may be common to the other suppressors 601.1-601.B. A combiner 602 sums the constituent signals to produce a synthesized received signal associated with base station s, $\tilde{y}_{a,s}^{[i]}(t) = \Sigma_{j=0}^{J_a} \tilde{y}_{a,s,j}^{[i]}$, where $\tilde{y}_{a,s,j}^{[i]}$ is the $j^{th}$ constituent finger or sub channel signal on the $a^{th}$ antenna for base station s.

A second processor 610 comprises a combiner 611 configured for combining the synthesized received signals across base stations to produce a combined synthesized receive signal $\tilde{y}_a^{[i]}(t) = \Sigma_{s=1}^B \tilde{y}_{a,s}^{[i]}$ corresponding to the $a^{th}$ antenna. A subtraction module 612 produces a signal from the difference between the combined synthesized receive signal and the actual received signal to create a residual signal $y_a(t)-\tilde{y}_a^{[i]}(t)$. A step size scaling module 613 scales the residual signal with a complex stabilizing step size $\mu_a^{[i]}$ 613 to give a scaled residual signal $\mu_a^{[i]}(y_a(t)-\tilde{y}_a^{[i]}(t))$. The scaled residual signal is returned to the suppressors 601.1-601.B in the first processor 601 where combiners, such as combiners 603.1-603.J in the suppressor 601.s add the scaled residual signal to the constituent signals to produce a set of interference-suppressed constituents expressed by $$z_{a,s,j}^{[i]}(t)=\tilde{y}_{a,s,l}^{[i]}(t)+\mu_a^{[i]}(y_a(t)-\tilde{y}_a^{[i]}(t)) \quad \text{Equation 11}$$

for an interference-suppressed $j^{th}$ constituent finger or sub channel signal on the $a^{th}$ antenna for base station s. The term $\mu_a^{[i]}$ may be evaluated as shown in U.S. patent application Ser. No. 11/451,932, which describes calculating a step size for a single receive antenna. In one embodiment the same step size may be employed for all antennas, meaning $\mu_a^{[i]}=\mu^{[i]}$ for all a.

Figure 7A:
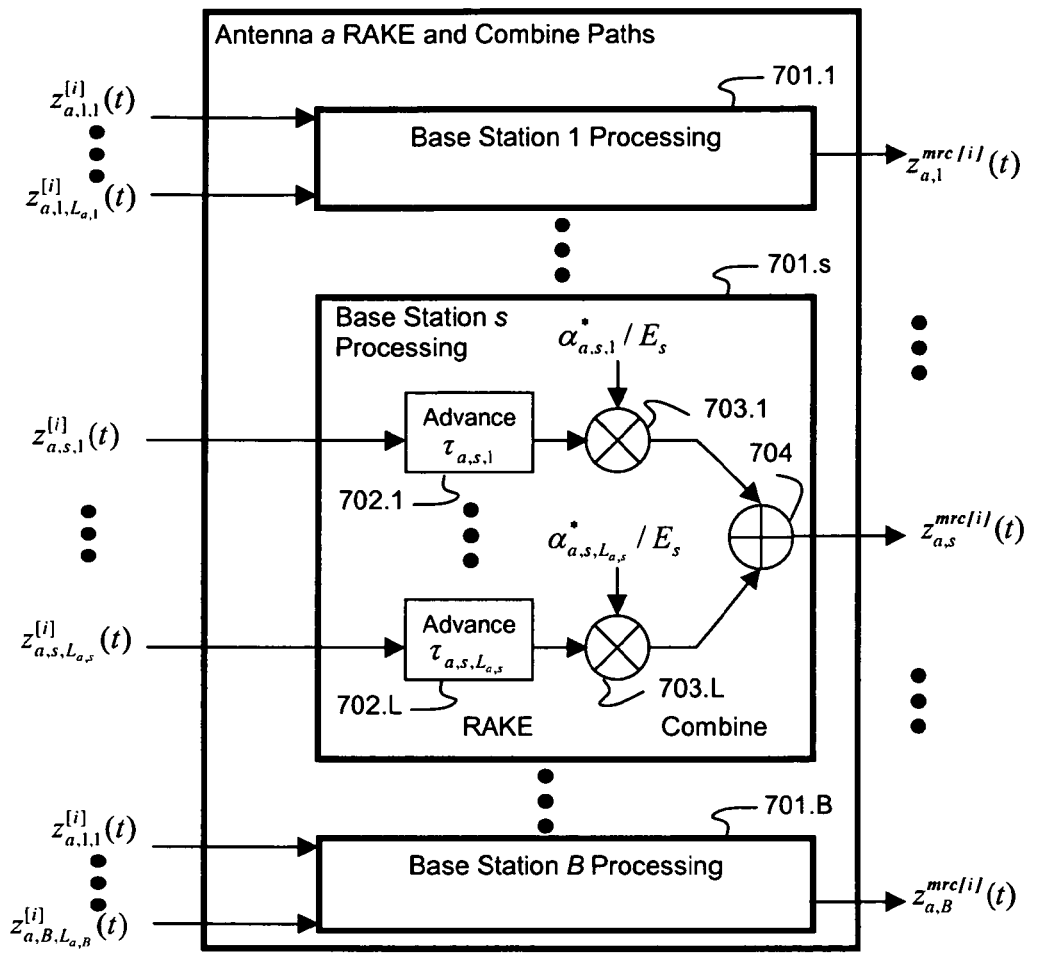
FIG. 7a is a block diagram illustrating per-antenna RAKE processing and combining on interference-suppressed finger signals.
Figure 7B:
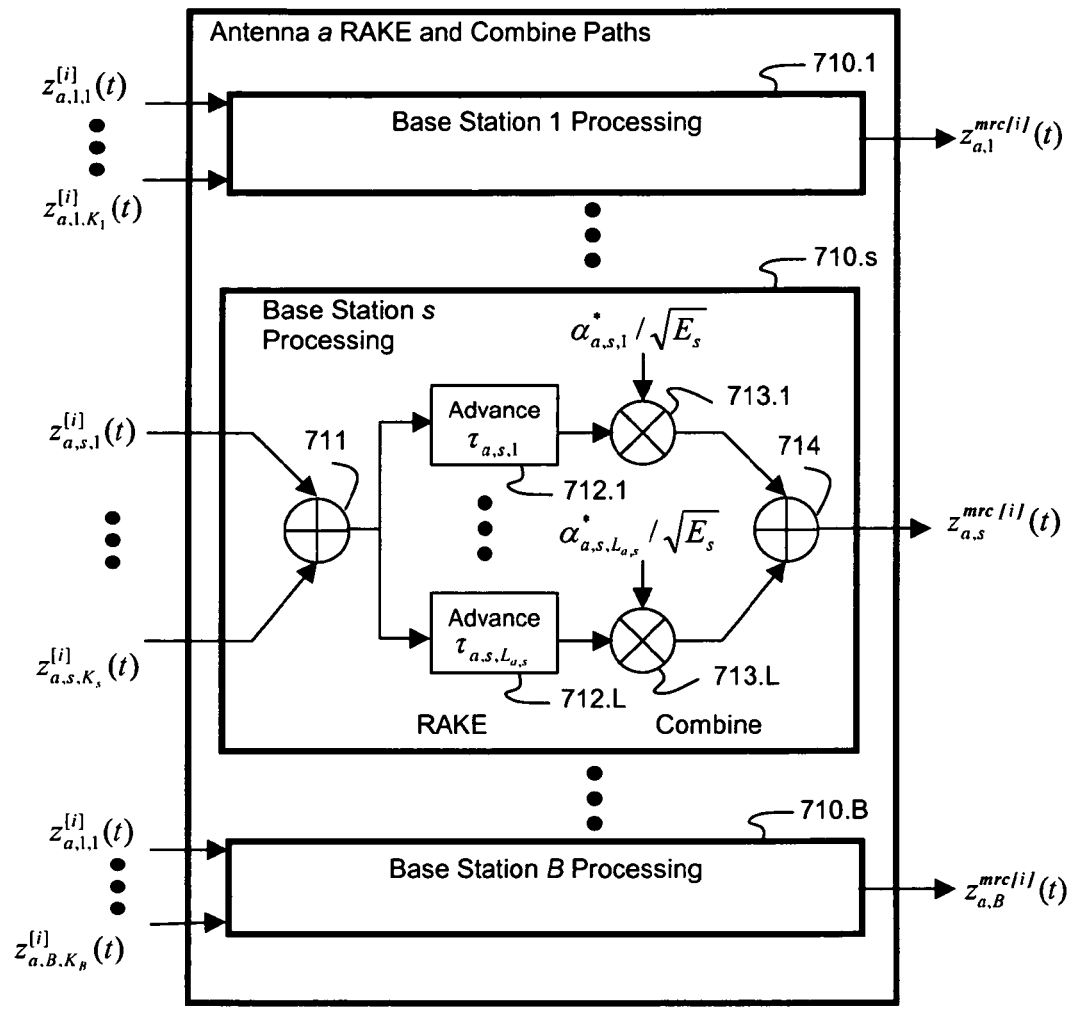
FIG. 7b is a block diagram illustrating per-antenna RAKE processing and combining on interference-suppressed sub channel constituent signals.

FIG. 7a is a block diagram of an apparatus configured for performing RAKE processing and combining 405.1-405.A on the interference-suppressed constituent signals for each antenna. Each of a plurality B of Rake processors 701.1-701.B is configured for processing finger constituents for each base station. Processor 701.s shows components that are common to all of the processors 701.1-701.B. A plurality L of time-advance modules 702.1-702.L advance finger signal inputs by multi path time shifts. Scaling modules 703.1-703.L scale the time-shifted inputs by complex channel gains, and the resulting scaled signals are summed 704 to yield the maximal ratio combined (MRC) output $$z_{a,s}^{mrc,[i]}(t) = \frac{1}{\sqrt{E_s}} \sum_{l=1}^{L_{a,s}} \alpha_{a,s,l}^* z_{a,s,l}(t-\tau_{a,s,l}) \quad \text{Equation 12}$$

associated with antenna a and base station s,

In FIG. 7b, Rake processors 710.1-710.B may each comprise a combiner 711 configured for summing the sub channel constituent signals, a plurality L of time-advance modules 712.1-712.L configured for advancing the sum by multi path time offsets, scaling modules 713.1-713.L configured for scaling the sum by corresponding multi path channel gains, and a combiner 714 configured for summing the scaled signals to produce the MRC output $$z_{a,s}^{mrc,[i]}(t) = \frac{1}{\sqrt{E_s}} \sum_{l=1}^{L_{a,s}} \alpha_{a,s,l}^* \sum_{k=1}^{K_s} z_{a,s,k}(t-\tau_{a,s,l}) \quad \text{Equation 13}$$

associated with antenna a and base station s.

Figure 8:
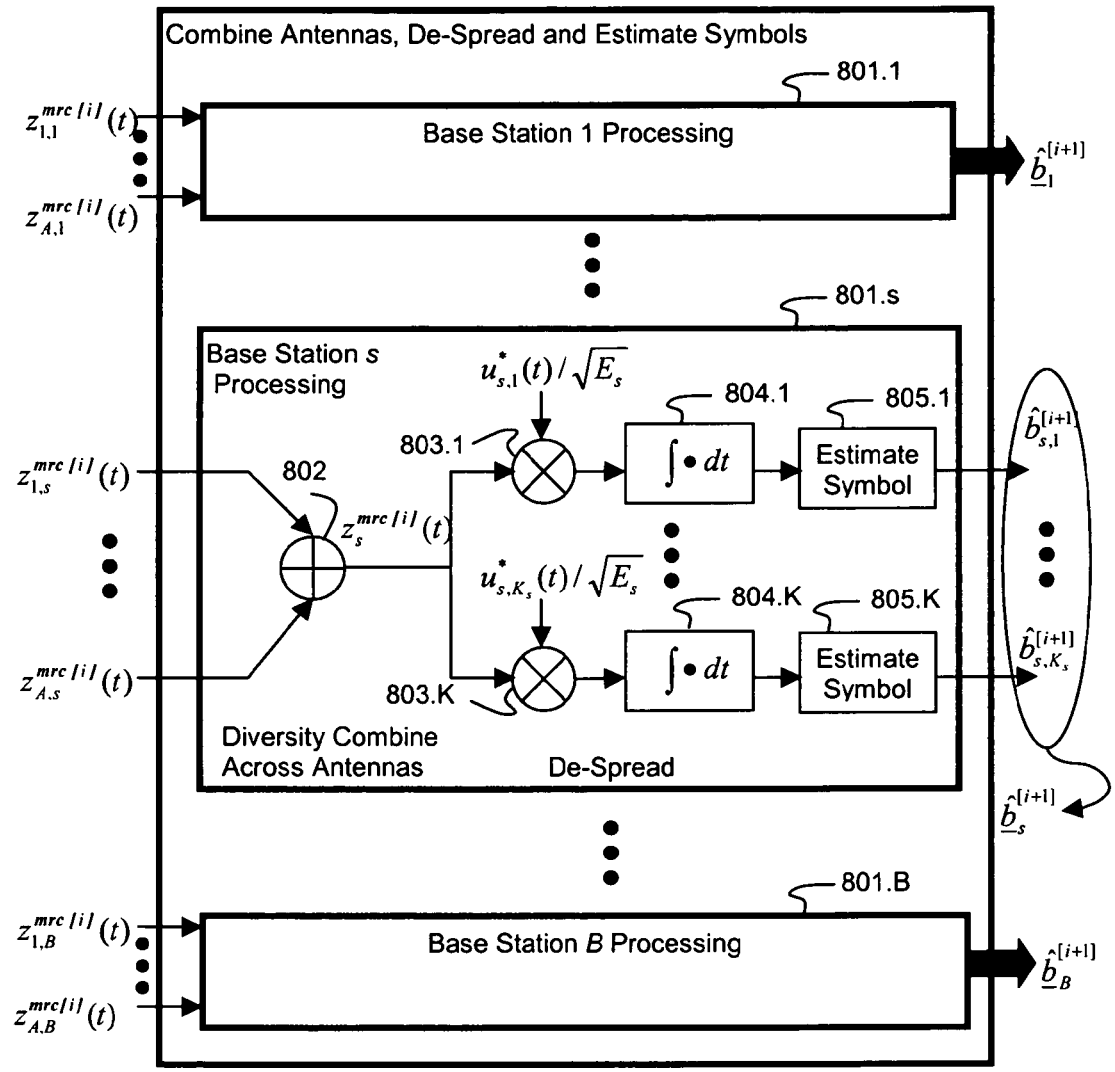
FIG. 8 is a block diagram illustrating antenna combining, de-spreading, and symbol estimation in an ICU.

FIG. 8 shows an apparatus configured for performing the steps 406.1-406.B shown in FIG. 4 to produce the updated symbol estimates. Each of a plurality B of processors 801.1-801.B is configured for processing the MRC outputs. Processor 801.s shows details that are common to all of the processors 801.1-801.B.

For each base station, the MRC signals for all antennas are summed 802 to form the overall MRC signal $$z_s^{mrc,[i]}(t)=\sum_{a=1}^{A} z_{a,s}^{mrc,[i]}(t), \quad \text{Equation 14}$$

which is resolved by code multipliers 803.1-803.K and integrators 804.1-804.K onto the sub channel code waveforms. Symbol estimators 805.1-805.K are employed for producing symbol estimates, such as mixed-decision symbol estimates as described in U.S. patent application Ser. No. 11/451,932.

Because of the linear nature of many of the ICU components, alternative embodiments of the invention may comprise similar components employed in a different order of operation without affecting the overall functionality. In one embodiment, antenna combining and de-spreading may be performed prior to interference suppression, such as illustrated in FIG. 9.

Figure 9A:
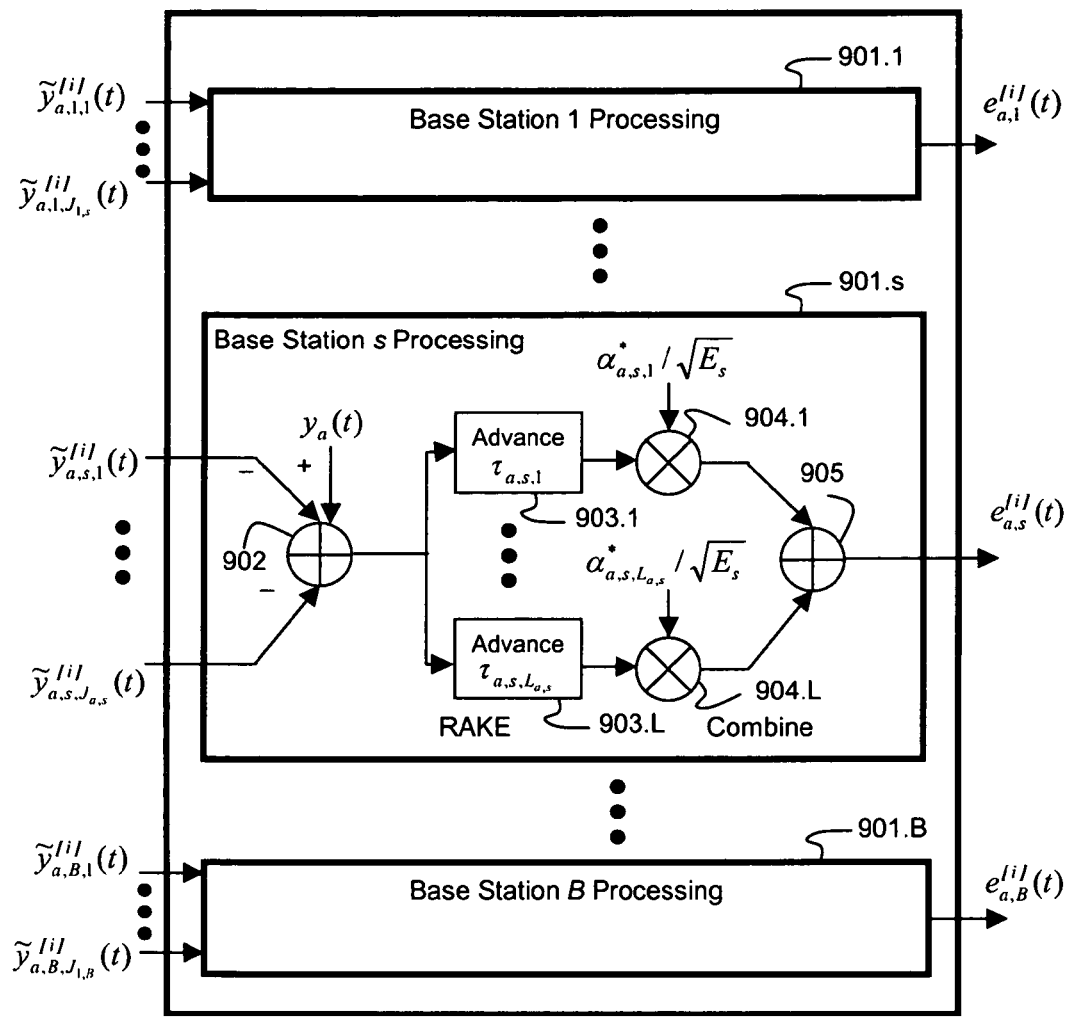
FIG. 9a is a block diagram illustrating an ICU wherein subtractive suppression is performed after signal de-spreading.

FIG. 9a illustrates a plurality of processing blocks 901.1-901.B configured for processing constituent finger or sub-channel signals received from each of a plurality of base stations. The constituent signals are subtracted from the received signal on antenna a by a subtraction module 902 to produce a residual signal. The residual signal is processed by a RAKE 903.1-903.L and maximal ratio combiner (comprising weighting modules 904.1-904.L and an adder 905) to produce an error signal $e_{a,s}^{[i]}(t)$ for antenna a and base station s.

Figure 9B:
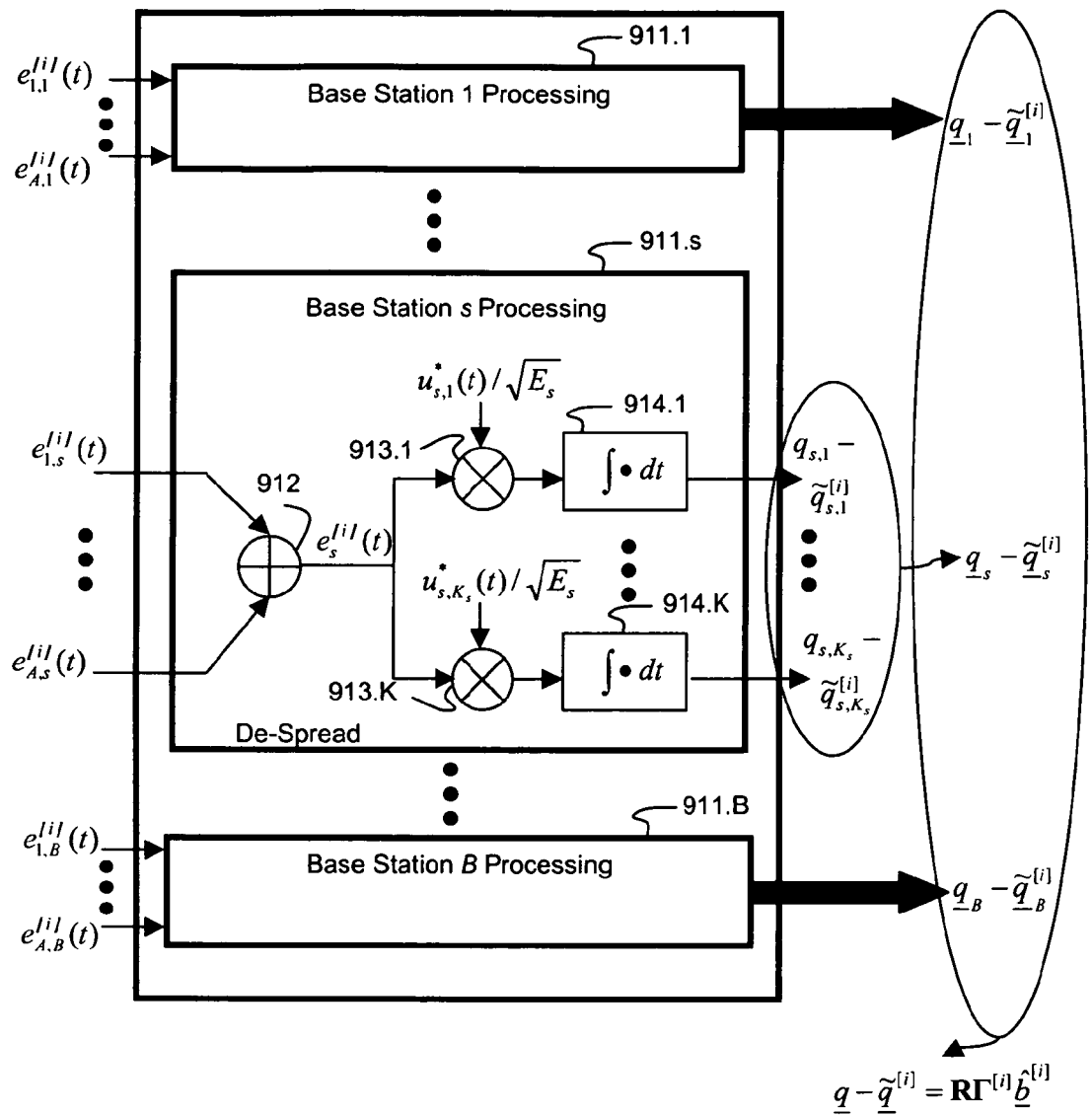
FIG. 9b shows an alternative embodiment of an ICU configured for performing subtractive suppression after signal de-spreading.

In FIG. 9b, each of a plurality of processing blocks 911.1-911.B is configured to combine the error signals produced by the apparatus shown in FIG. 9a. In processing block 911.s, a combiner 912 combines the error signals corresponding to the $s^{th}$ base station across the antennas to produce $e_s^{[i]}(t)$, the error signal for base station s. Despreaders comprising code multipliers 913.1-913.K and integrators 914.1-914.K resolve the error signal $e_s^{[i]}(t)$ onto code waveforms of sub channels associated with the $s^{th}$ base station.

The output for the $k^{th}$ sub channel of base station s is $\int_0^T u_k^*(t) e_s^{[i]}(t)dt$, which is equal to $q_{s,k}-\tilde{q}_{s,k}^{[i]}$, where $q_{s,k}$ is defined in Equation 4, and $$\tilde{q}_{s,k}^{[i]} = \frac{1}{E_s} \sum_{a=1}^{A} \int_0^T u_k^*(t) \sum_{l=1}^{L_{a,s}} \alpha_{a,s,l}^* \sum_{j=1}^{J_{a,s}} \tilde{y}_{a,s,j}(t-\tau_{a,s,l}) dt$$

For each base station, the values $q_{s,k}$ and $\tilde{q}_{s,k}^{[i]}$ may be stacked into a vector over the sub channel index k to form $\underline{q}_s-\underline{\tilde{q}}_s^{[i]}$. These likewise may be stacked into a single vector over the base station index s to give $\underline{q}-\underline{\tilde{q}}^{[i]}$. This quantity may also be determined explicitly using a matrix multiplication.

Figure 9C:
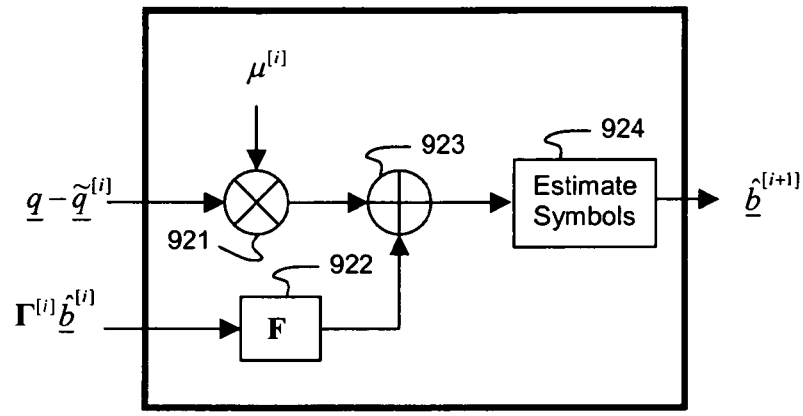
FIG. 9c shows another embodiment of an ICU.

FIG. 9c illustrates a final step of an interference-suppression process. A stabilizing step size module 921 scales the difference $\underline{q}-\underline{\tilde{q}}^{[i]}$ by a stabilizing step size $\mu^{[i]}$, and the result is added 923 to the weighted input vector $\Gamma^{[i]}\underline{\hat{b}}^{[i]}$ after being multiplied 922 by implementation matrix F to produce a vector sum. The value of the implementation matrix F depends on whether finger or sub channel constituents are used. A symbol estimator 924 produces symbol estimates for each element of the vector sum.

Figure 10:
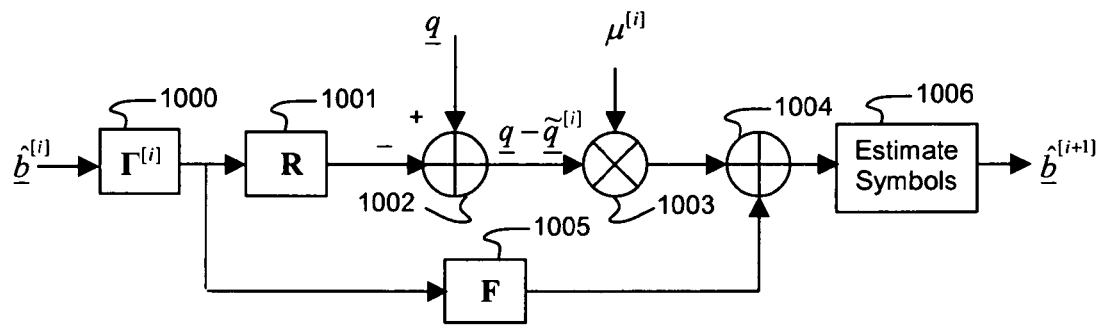
FIG. 10 is a block diagram of an ICU configured for an explicit implementation.

An explicit implementation of an ICU is illustrated in FIG. 10. The input symbol estimates are weighted 1000 and multiplied by a matrix R 1001. The resulting product is subtracted 1002 from front-end vector $\underline{q}$ and scaled with the stabilizing step size $\mu^{[i]}$ by a stabilizing step size module 1003. The resulting scaled signal is summed 1004 with weighted symbol estimates multiplied 1005 by the implementation matrix F to produce a vector sum. A symbol estimator 1006 makes decisions on the vector sum.

Matrix R is the correlation matrix for all sub channels at the receiver after combining across antennas. It may be evaluated by $$R=\sum_{a=1}^{A} R_a \quad \text{Equation 15}$$

where $R_a$ is the correlation matrix for all sub channels at the $a^{th}$ antenna, and it may be determined as described in U.S. patent application Ser. No. 11/451,932 for a single antenna receiver. The matrix F is either the identity matrix when sub channel constituent signals are employed or the correlation matrix for all sub channels at the transmitter(s) when finger constituent signals are used, such as described in U.S. patent application Ser. No. 11/451,932. This functionality may be represented by the one-step matrix-update equation $$\hat{\underline{b}}^{[i+1]} = \Psi(\mu^{[i]}(\underline{q} - R\Gamma^{[i]}\hat{\underline{b}}^{[i]}) + F\Gamma^{[i]}\hat{\underline{b}}^{[i]}),$$ Equation 16 where $\Psi(\cdot)$ represents any function that returns a symbol estimate for each element of its argument (including, for example, any of the mixed-decision symbol estimation functions described in U.S. patent application Ser. No. 11/451,932) and all other quantities as previously described.

The stabilizing step size $\mu^{[i]}$ may take any of the forms described in U.S. patent application Ser. No. 11/451,932 that depend on the correlation matrix R, the implementation matrix F, and the weighting matrix $\Gamma^{[i]}$. Two of these forms of $\mu^{[i]}$ are implicitly calculable, such as described in U.S. patent application Ser. No. 11/451,932 for a single receive antenna.

Figure 11A:
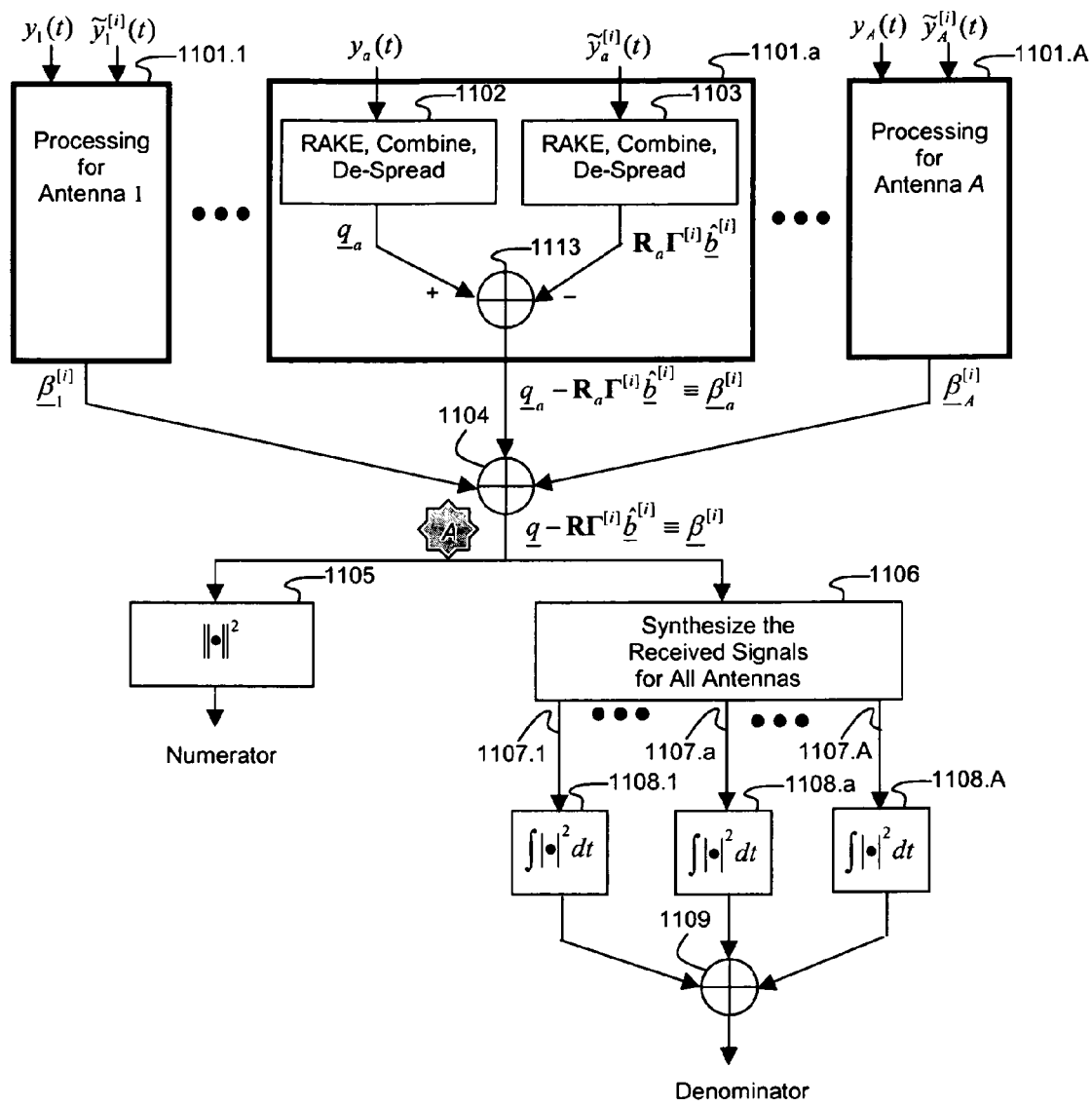
FIG. 11a is a block diagram illustrating a method for evaluating a stabilizing step size implicitly in hardware.
Figure 11B:
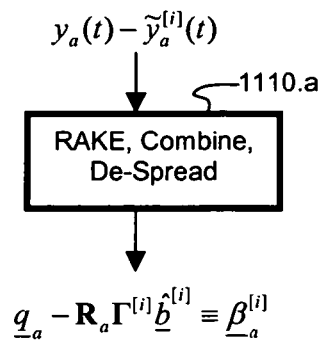
FIG. 11b is a block diagram depicting calculation of a difference signal in accordance with an embodiment of the present invention.

FIG. 11a illustrates a method for calculating a stabilizing step size when multiple receive antennas are employed. Preliminary processing 1101.1-1101.A for each antenna provides for RAKE processing, combining, and de-spreading 1102 on the received signal, and RAKE processing, combining, and de-spreading 1103 on the synthesized received signal and produces 1113 a difference signal. In an alternative embodiment for the preliminary processing 1101.1-1101.A shown in FIG. 11b, a difference signal calculated from the received signal and the synthesized received signal undergoes RAKE processing, combining, and de-spreading 1110.a.

The difference-signal vector corresponding to the $a^{th}$ antenna is denoted by $\underline{\beta}_a^{[i]}$. The difference-signal vectors for all of the antennas are summed to produce a sum vector $\underline{\beta}^{[i]}$. A sum of the square magnitudes 1105 of the elements of the sum vector (i.e., $\|\underline{\beta}^{[i]}\|^2$) provides a numerator of a ratio from which the stabilizing step size is evaluated. The elements of $\underline{\beta}^{[i]}$ are used as transmit symbols in order to synthesize 1106 received signals for each antenna. Synthesized received signals are expressed as $$\sum_{s=1}^{B} \sum_{l=1}^{L_{a,s}} \alpha_{a,s,l}^{*} \sum_{k=1}^{K_s} \beta_{s,k}^{[i]} u_{s,k}(t - \tau_{a,s,l})$$

for antenna a, where $\beta_{s,k}^{[i]}$ is the $k^{th}$ element of $\underline{\beta}^{[i]}$. An integral of the square magnitude of each synthesized signal is calculated 1108.1-1108.A and summed 1109 to produce the denominator of the ratio. The ratio of the numerator and the denominator gives the first version of the step size $\mu^{[i]}$.

Figure 11C:
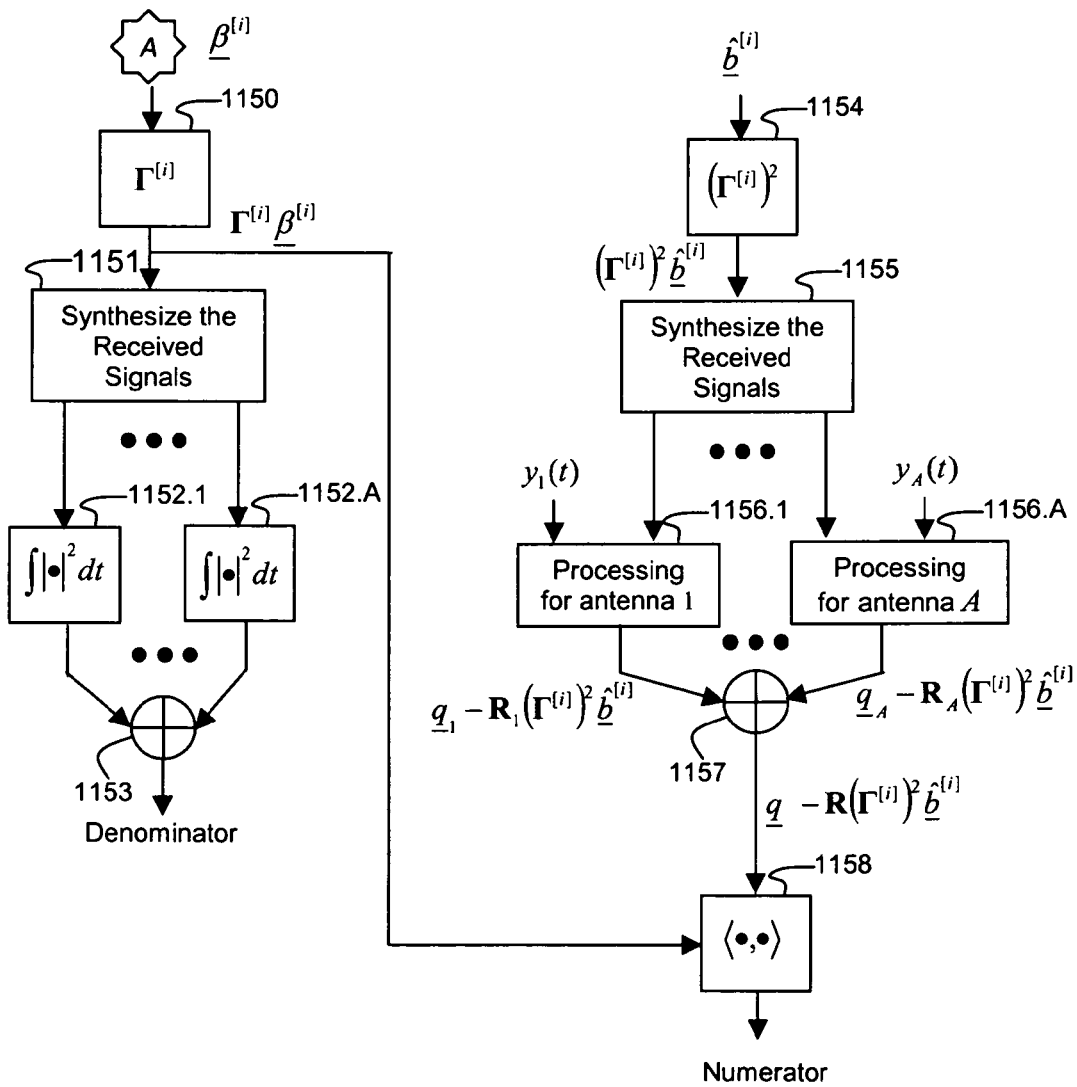
FIG. 11c is a block diagram depicting implicit evaluation of step size in accordance with an embodiment of the present invention.

FIG. 11c shows an implicit evaluation of the step size in accordance with another embodiment of the invention. The denominator of the ratio used to calculate the stabilizing step size is determined by weighting 1150 the vector $\underline{\beta}^{[i]}$ by soft weights (such as contained in the diagonal matrix $\Gamma^{[i]}$). The elements of the resulting weighted vector are used to produce 1151 synthesized received signals for all of the antennas. Integrals of the square magnitudes of the synthesized received signals are calculated 1152.1-1152.A and summed 1153 to provide the denominator.

The corresponding numerator is calculated by scaling 1154 symbol estimates produced at the $i^{th}$ iteration by the square of the soft weights (as contained in the diagonal matrix $(\Gamma^{[i]})^2$). The resulting scaled vector is used to synthesize 1155 received signals for all of the antennas. The synthesized signals and the received signals are processed by a parallel bank of processors 1156.1-1156.A, each corresponding to a particular antenna. The functionality of each processor 1156.1-1156.A may be equivalent to the processor 1101.a shown in FIG. 11a. The vector outputs of the processors 1156.1-1156.A are summed 1157, and the numerator is produced from the inner product 1158 of the sum vector with the weighted vector.

Explicit versions of both versions of the step size are given, respectively, by $$\mu^{[i]} = \frac{(q - RF\Gamma^{[i]}\hat{\underline{b}}^{[i]})^H (q - RF\Gamma^{[i]}\hat{\underline{b}}^{[i]})}{(q - R\Gamma^{[i]}\hat{\underline{b}}^{[i]})^H R(q - R\Gamma^{[i]}\hat{\underline{b}}^{[i]})}$$ Equation 17 and $$\mu^{[i]} = \frac{(q - R\Gamma^{[i]}F\Gamma^{[i]}\hat{\underline{b}}^{[i]})^H \Gamma^{[i]}(q - R\Gamma^{[i]}\hat{\underline{b}}^{[i]})}{(q - R\Gamma^{[i]}\hat{\underline{b}}^{[i]})^H (\Gamma^{[i]})^H R\Gamma^{[i]}(q - R\Gamma^{[i]}\hat{\underline{b}}^{[i]})}$$ Equation 18 wherein all quantities shown are as previously defined.

Another form of the step size in U.S. patent application Ser. No. 11/451,932 depends only on the path gains, and may be generalized to multiple receive antennas according to $$\mu^{[i]} = \mu = \max\left\{C, \frac{\max_{s,l} \sum_{a=1}^{A} |\alpha_{a,s,l}|^p}{\sum_{a=1}^{A} \sum_{s=1}^{B} \sum_{l=1}^{L_{a,s}} |\alpha_{a,s,l}|^p}\right\},$$ Equation 19 where $\mu^{[i]}$ is fixed for every ICU and C and p are non-negative constants.

Embodiments of the invention are also applicable to the reverse-link, such as described for the single receive antenna in U.S. patent application Ser. No. 11/451,932. The primary difference (when compared to the forward-link) is that sub channels from distinct transmitters experience different multi path channels and, thus, the receiver must accommodate each sub channel with its own RAKE/Combiner/De-Spreader, and channel emulation must take into account that, in general, every sub channel sees its own channel. Such modifications are apparent to those knowledgeable in the art.

Embodiments of the invention may be realized in hardware or software and there are several modifications that can be made to the order of operations and structural flow of the processing. Those skilled in the art should recognize that method and apparatus embodiments described herein may be implemented in a variety of ways, including implementations in hardware, software, firmware, or various combinations thereof. Examples of such hardware may include Application Specific Integrated Circuits (ASICs), Field Programmable Gate Arrays (FPGAs), general-purpose processors, Digital Signal Processors (DSPs), and/or other circuitry. Software and/or firmware implementations of the invention may be implemented via any combination of programming languages, including Java, C, C++, Matlab™, Verilog, VHDL, and/or processor specific machine and assembly languages.

Computer programs (i.e., software and/or firmware) implementing the method of this invention may be distributed to users on a distribution medium such as a SIM card, a USB memory interface, or other computer-readable memory adapted for interfacing with a consumer wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g. a microprocessor) to act in accordance with the method of this invention. All these operations are well known to those skilled in the art of computer systems.

The functions of the various elements shown in the drawings, including functional blocks labeled as "modules" may be provided through the use of dedicated hardware, as well as hardware capable of executing software in association with appropriate software. When provided by a processor, the functions may be performed by a single dedicated processor, by a shared processor, or by a plurality of individual processors, some of which may be shared. Moreover, explicit use of the term "processor" or "module" should not be construed to refer exclusively to hardware capable of executing software, and may implicitly include, without limitation, digital signal processor OSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

We claim:

1. A wireless terminal, comprising:
   a plurality of antennas configured to receive multiple-access communication signals from a plurality of transmission sources;
   a plurality of RAKE receivers configured to separate the multiple-access communication signals into a plurality of constituent signals for each transmission source;
   a plurality of constituent-signal analyzers configured to generate a plurality of initial symbol estimates from the plurality of constituent signals; and
   one or more interference suppression units configured to generate, from the plurality of initial symbol estimates, a synthesized received signal for each antenna of the plurality of antenna, subtract the respective synthesized received signal from the multiple-access communication signal received by each antenna to obtain a plurality of residual signals for the plurality of antenna, combine the plurality of residual signals with the plurality of constituent signals to obtain interference-suppressed constituent signals, and generate a plurality of updated symbol estimates based on the interference-suppressed constituent signals.

2. The wireless terminal of claim 1, wherein an interference suppression unit of the one or more interference suppression units is configured to generate, from the plurality of initial symbol estimates, multipath constituent signals for each transmission source of the plurality of transmission sources relative to an antenna of the plurality of antennas, and generate, for the antenna, a residual signal of the plurality of residual signals based on the multipath constituent signals.

3. The wireless terminal of claim 1, wherein an interference suppression unit of the one or more interference suppression units, comprises:
   a multipath constituent generator configured to generate, from the plurality of initial symbol estimates, multipath constituent signals for each transmission source of the plurality of transmission sources relative to an antenna of the plurality of antennas;
   a plurality of subtractive suppressors, each configured to combine the multipath constituent signals for a respective transmission source to obtain a combined multipath signal for the respective transmission source, and combine a residual signal of the plurality of residual signals with the multipath constituent signals for the respective transmission source to obtain the interference-suppressed constituent signals; and
   a processor configured to combine the combined multipath signals for the plurality of transmission sources relative to the antenna of the plurality of antennas to obtain the synthesized received signal for the antenna, and subtract the synthesized received signal from the multiple-access communication signal received by the antenna to obtain the residual signal.

4. The wireless terminal of claim 1, wherein an interference suppression unit of the one or more interference suppression units, comprises:
   a multipath constituent generator configured to generate, from the plurality of initial symbol estimates, multipath constituent signals for each transmission source of the plurality of transmission sources relative to an antenna of the plurality of antennas;
   a plurality of subtractive suppressors, each configured to combine the multipath constituent signals for a respective transmission source to obtain a combined multipath signal for the respective transmission source, and combine a scaled residual signal with the multipath constituent signals for the respective transmission source to obtain the interference-suppressed constituent signals; and
   a processor configured to combine the combined multipath signals for the plurality of transmission sources relative to the antenna of the plurality of antennas to obtain the synthesized received signal for the antenna, subtract the synthesized received signal from the multiple-access communication signal received by the antenna to obtain a residual signal of the plurality of residual signals, and scale the residual signal by a stabilizing step size to obtain the scaled residual signal.

5. The wireless terminal of claim 1, wherein an interference suppression unit of the one or more interference suppression units, is configured to generate, from the plurality of initial symbol estimates, subchannel constituent signals for each transmission source of the plurality of transmission sources relative to an antenna of the plurality of antennas, and generate the plurality of residual signals based on the subchannel constituent signals.

6. The wireless terminal of claim 1, wherein an interference suppression unit of the one or more interference suppression units, comprises:
- a subchannel constituent generator configured to generate, from the plurality of initial symbol estimates, subchannel constituent signals for each transmission source of the plurality of transmission sources relative to an antenna of the plurality of antennas;
- a plurality of subtractive suppressors, each configured to combine the subchannel constituent signals for a respective transmission source to obtain a combined subchannel signal for the respective transmission source, and combine a residual signal of the plurality of residual signals with the subchannel constituent signals for the respective transmission source to obtain the interference-suppressed constituent signals; and
- a processor configured to combine the combined subchannel signals for the plurality of transmission sources relative to the antenna of the plurality of antennas to obtain the synthesized received signal for the antenna, and subtract the synthesized receive signal from the multiple-access communication signal received by the antenna to obtain the residual signal.

7. The wireless terminal of claim 1, wherein an interference suppression unit of the one or more interference suppression units, comprises:
- a subchannel constituent generator configured to generate, from the plurality of initial symbol estimates, subchannel constituent signals for each transmission source of the plurality of transmission sources relative to an antenna of the plurality of antennas;
- a plurality of subtractive suppressors, each configured to combine the subchannel constituent signals for a respective transmission source to obtain a combined subchannel signal for the respective transmission source, and combine a scaled residual signal with the subchannel constituent signals for the respective transmission source to obtain the interference-suppressed constituent signals; and
- a processor configured to combine the combined subchannel signals for the plurality of transmission sources relative to the antenna of the plurality of antennas to obtain the synthesized received signal for the antenna, subtract the synthesized receive signal from the multiple-access communication signal received by the antenna to obtain a residual signal of the plurality of residual signals, and scale the residual signal by a stabilizing step size to obtain the scaled residual signal.

8. The wireless terminal of claim 1, wherein:
- the one or more interference suppression units comprise at least a first interference suppression unit and a second interference suppression unit;
- the first interference suppression unit is configured to receive the plurality of initial symbol estimates and generate a first plurality of updated symbol estimates; and
- the second interference suppression unit is configured to receive the first plurality of updated symbol estimates from the first interference suppression unit as its plurality of initial symbol estimates and generate a second plurality of updated symbol estimates.

9. The wireless terminal of claim 1, wherein the one or more interference suppression units consists of a single interference suppression configured to iteratively update the plurality of initial symbol estimates to obtain the plurality of updated symbol estimates.

10. A wireless terminal, comprising:
- a plurality of antennas configured to receive multiple-access communication signals from a plurality of transmission sources;
- a plurality of RAKE receivers configured to separate the multiple-access communication signals into a plurality of constituent signals for each transmission source;
- a computer-readable memory with stored firmware; and
- a processor configured to execute the stored firmware of the computer-readable memory, wherein the processor, in response to executing the stored firmware, is configured to:
- generate a plurality of initial symbol estimates from the plurality of constituent signals;
- generate, from the plurality of initial symbol estimates, a synthesized received signal for each antenna of the plurality of antenna;
- subtract the respective synthesized received signal from the multiple-access communication signal received by each antenna to obtain a plurality of residual signals for the plurality of antenna;
- combine the plurality of residual signals with the plurality of constituent signals to obtain interference-suppressed constituent signals; and
- generate a plurality of updated symbol estimates based on the interference-suppressed constituent signals.

11. The wireless terminal of claim 10, wherein the processor, in response to executing the stored firmware, is further configured to:
- generate, from the plurality of initial symbol estimates, multipath constituent signals for each transmission source of the plurality of transmission sources relative to an antenna of the plurality of antennas; and
- generate, for the antenna, a residual signal of the plurality of residual signals based on the multipath constituent signals.

12. The wireless terminal of claim 10, wherein the processor, in response to executing the stored firmware, is further configured to:
- generate, from the plurality of initial symbol estimates, multipath constituent signals for each transmission source of the plurality of transmission sources relative to an antenna of the plurality of antennas;
- combine the multipath constituent signals for a respective transmission source to obtain a combined multipath signal for the respective transmission source;
- combine a residual signal of the plurality of residual signals with the multipath constituent signals for the respective transmission source to obtain the interference-suppressed constituent signals;
- combine the combined multipath signals for the plurality of transmission sources relative to the antenna of the plurality of antennas to obtain the synthesized received signal for the antenna; and
- subtract the synthesized received signal from the multiple-access communication signal received by the antenna to obtain the residual signal.

13. The wireless terminal of claim 10, wherein the processor, in response to executing the stored firmware, is further configured to:
- generate, from the plurality of initial symbol estimates, multipath constituent signals for each transmission source of the plurality of transmission sources relative to an antenna of the plurality of antennas;
- combine the multipath constituent signals for a respective transmission source to obtain a combined multipath signal for the respective transmission source;

combine a scaled residual signal with the multipath constituent signals for the respective transmission source to obtain the interference-suppressed constituent signals;

combine the combined multipath signals for the plurality of transmission sources relative to the antenna of the plurality of antennas to obtain the synthesized received signal for the antenna;

subtract the synthesized receive signal from the multiple-access communication signal received by the antenna to obtain a residual signal of the plurality of residual signals; and scale the residual signal by a stabilizing step size to obtain the scaled residual signal.

14. The wireless terminal of claim 10, wherein the processor, in response to executing the stored firmware, is further configured to:

generate, from the plurality of initial symbol estimates, subchannel constituent signals for each transmission source of the plurality of transmission sources relative to an antenna of the plurality of antennas; and generate the plurality of residual signals based on the subchannel constituent signals.

15. The wireless terminal of claim 10, wherein the processor, in response to executing the stored firmware, is further configured to:

generate, from the plurality of initial symbol estimates, subchannel constituent signals for each transmission source of the plurality of transmission sources relative to an antenna of the plurality of antennas;

combine the subchannel constituent signals for a respective transmission source to obtain a combined subchannel signal for the respective transmission source;

combine a residual signal of the plurality of residual signals with the subchannel constituent signals for the respective transmission source to obtain the interference-suppressed constituent signals;

combine the combined subchannel signals for the plurality of transmission sources relative to the antenna of the plurality of antennas to obtain the synthesized received signal for the antenna; and subtract the synthesized receive signal from the multiple-access communication signal received by the antenna to obtain the residual signal.

16. The wireless terminal of claim 10, wherein the processor, in response to executing the stored firmware, is further configured to:

generate, from the plurality of initial symbol estimates, subchannel constituent signals for each transmission source of the plurality of transmission sources relative to an antenna of the plurality of antennas;

combine the subchannel constituent signals for a respective transmission source to obtain a combined subchannel signal for the respective transmission source;

combine a scaled residual signal with the subchannel constituent signals for the respective transmission source to obtain the interference-suppressed constituent signals;

combine the combined subchannel signals for the plurality of transmission sources relative to the antenna of the plurality of antennas to obtain the synthesized received signal for the antenna;

subtract the synthesized received signal from the multiple-access communication signal received by the antenna to obtain a residual signal of the plurality of residual signals; and scale the residual signal by a stabilizing step size to obtain the scaled residual signal.

17. The wireless terminal of claim 10, wherein the processor, in response to executing the stored firmware, is further configured to iteratively update the plurality of initial symbol estimates to obtain the plurality of updated symbol estimates.

* * * * *